(12) United States Patent
Kawase et al.

(10) Patent No.: US 10,710,638 B2
(45) Date of Patent: Jul. 14, 2020

(54) VEHICLE LOWER PORTION STRUCTURE

(71) Applicant: TOYOTA JIDOSHA KABUSHIKI KAISHA, Toyota-shi (JP)

(72) Inventors: Kyosuke Kawase, Okazaki (JP); Masaki Ito, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 195 days.

(21) Appl. No.: 15/962,093

(22) Filed: Apr. 25, 2018

(65) Prior Publication Data
US 2018/0312200 A1 Nov. 1, 2018

(30) Foreign Application Priority Data

Apr. 28, 2017 (JP) .................................. 2017-090781
Dec. 14, 2017 (JP) .................................. 2017-239998

(51) Int. Cl.
| | | |
|---|---|---|
| B62D 21/15 | (2006.01) | |
| B60K 1/04 | (2019.01) | |
| B62D 21/02 | (2006.01) | |
| B60K 15/063 | (2006.01) | |
| B62D 25/20 | (2006.01) | |
| B62D 29/00 | (2006.01) | |

(52) U.S. Cl.
CPC .............. B62D 21/157 (2013.01); B60K 1/04 (2013.01); B60K 15/063 (2013.01); B62D 21/02 (2013.01); B62D 25/2036 (2013.01); B60K 2001/0438 (2013.01); B60K 2001/0472 (2013.01); B60K 2015/0634 (2013.01); B60Y 2306/01 (2013.01); B62D 29/008 (2013.01)

(58) Field of Classification Search
CPC .. B62D 21/157; B62D 21/02; B62D 25/2036; B60K 1/04; B60K 15/063; B60K 2015/0634; B60K 2001/0472; B60K 2001/0438; B60Y 2306/01
USPC .................................................... 296/187.12
See application file for complete search history.

(56) References Cited

U.S. PATENT DOCUMENTS

| | | | |
|---|---|---|---|
| 8,696,051 B2 | 4/2014 | Charbonneau et al. | |
| 8,708,402 B2 * | 4/2014 | Saeki ....................... | B60K 1/04 |
| | | | 180/68.5 |

(Continued)

FOREIGN PATENT DOCUMENTS

| | | |
|---|---|---|
| DE | 20 2016 107 206 U1 | 2/2017 |
| DE | 20 2016 107 254 U1 | 2/2017 |

(Continued)

*Primary Examiner* — Joseph D. Pape
*Assistant Examiner* — Dana D Ivey
(74) *Attorney, Agent, or Firm* — Oblon, McClelland, Maier & Neustadt, L.L.P.

(57) ABSTRACT

A vehicle lower portion structure includes a pair of rocker panels and an electric power supply device. The rocker panel is configured to include an outer portion, an inner portion, and a first shock absorbing portion. The outer portion is positioned on an outer side in a vehicle width direction. The inner portion is formed integrally with the outer portion, is positioned inward of the outer portion in the vehicle width direction, and forms a closed sectional portion with the outer portion. The first shock absorbing portion extends in the vehicle width direction from the outer portion to the inner portion in the closed sectional portion and is disposed to overlap the electric power supply device in vehicle side view.

13 Claims, 10 Drawing Sheets

(56) References Cited

U.S. PATENT DOCUMENTS

| | | |
|---|---|---|
| 2013/0088044 A1 | 4/2013 | Charbonneau et al. |
| 2013/0088045 A1 | 4/2013 | Charbonneau et al. |
| 2013/0270864 A1 | 10/2013 | Young et al. |
| 2014/0049070 A1 | 2/2014 | Young et al. |
| 2015/0174996 A1* | 6/2015 | Ikeda .................. B60K 1/04 180/68.5 |
| 2017/0210426 A1 | 7/2017 | Gao et al. |
| 2017/0210427 A1 | 7/2017 | Akhlaque-E-Rasul et al. |

FOREIGN PATENT DOCUMENTS

| | | |
|---|---|---|
| JP | 2006-182295 A | 7/2006 |
| JP | 2011-126452 | 6/2011 |
| JP | 2013-133046 | 7/2013 |
| JP | 2014-226957 | 12/2014 |

\* cited by examiner

VEHICLE LOWER PORTION STRUCTURE

INCORPORATION BY REFERENCE

The disclosure of Japanese Patent Application Nos. 2017-090781 filed on Apr. 28, 2017 and 2017-239998 filed on Dec. 14, 2017 including the specification, drawings and abstract are incorporated herein by reference in their entirety.

BACKGROUND

1. Technical Field

The present disclosure relates to a vehicle lower portion structure.

2. Description of Related Art

Japanese Unexamined Patent Application Publication No. 2013-133046 (JP 2013-133046 A) discloses a technique relating to a vehicular battery mounting structure for supporting a battery unit as a drive force supply device at a portion below a floor panel. Specifically, in the related art, a square tube-shaped battery side frame is disposed between a rocker panel and the battery unit and disposed adjacent to the rocker panel and the battery unit.

Once an impact load is input to the rocker panel as a result of a side collision of a vehicle and the rocker panel is deformed toward the inner side in a vehicle width direction (inner side of the rocker panel), a tensile force acts on the inner side of the rocker panel in the vehicle width direction. In the related art, the battery side frame is disposed adjacent to the rocker panel as described above, and thus a compressive force acts on the rocker panel side of the battery side frame.

In other words, in the related art, stresses acting on each other are canceled out between the tensile force and the compressive force acting at the parts of the rocker panel and the battery side frame adjacent to each other. As a result, deformation of the rocker panel and the battery side frame is suppressed and intrusion (so-called inward folding) of the rocker panel to the inner side in the vehicle width direction is suppressed.

SUMMARY

In general, however, the dimension of the battery unit differs from vehicle to vehicle and, in the case of the related art, the size of the battery side frame needs to be changed in accordance with the dimension of the battery unit for inward folding of the rocker panel to be suppressed. In other words, an increase in cost may occur to the same extent as the versatility of the battery side frame itself is low.

The disclosure provides a vehicle lower portion structure with which inward folding of a rocker panel can be suppressed with an increase in cost suppressed.

A first aspect of the disclosure relates to a vehicle lower portion structure including a pair of rocker panels, and an electric power supply device. The rocker panels extend along a vehicle front-rear direction, and are respectively arranged on both outer sides of a vehicular floor panel in a vehicle width direction. The electric power supply device is arranged below the floor panel. The rocker panel is configured to include an outer portion, an inner portion, and a first shock absorbing portion. The outer portion is positioned to define an outer wall of the rocker panel in the vehicle width direction. The inner portion is formed integrally with the outer portion, is positioned inward of the outer portion in the vehicle width direction, and forms a closed sectional portion with the outer portion. The first shock absorbing portion extends in the vehicle width direction from the outer portion to the inner portion in the closed sectional portion and is disposed to overlap the electric power supply device in vehicle side view.

In the vehicle lower portion structure according to the first aspect of the disclosure, the rocker panels are respectively arranged on both outer sides of the vehicular floor panel in the vehicle width direction and each of the rocker panels extends along the vehicle front-rear direction. The electric power supply device is arranged below the floor panel.

Examples of the electric power supply device include a storage battery and a fuel cell. Examples of the "storage battery" include a lithium-ion battery, a nickel-hydrogen battery, and a silicon battery. The "storage battery" refers to a state where, for example, a plurality of battery modules is accommodated in a case (hereinafter, also referred to as a "battery pack").

In the rocker panel according to the first aspect of the disclosure, the outer portion positioned on the outer side in the vehicle width direction and the inner portion positioned on an inner side in the vehicle width direction are formed integrally with each other and the outer portion and the inner portion form the closed sectional portion. The "integral formation" means that the outer portion and the inner portion are formed integrally with each other by extrusion, drawing, or the like.

In the disclosure, the outer portion and the inner portion are formed integrally with each other in the rocker panel. Accordingly, the rigidity of the rocker panel itself can be higher than in a case where, for example, a rocker panel is formed by two, outer and inner, panels being coupled with each other.

Welding, fastening, or the like is needed when the two, outer and inner, panels are coupled with each other for the rocker panel to be formed. In the disclosure, however, processing such as welding and fastening is not needed since the outer portion and the inner portion are formed integrally with each other, and thus cost reduction can be achieved to that extent.

In the closed sectional portion of the rocker panel, the first shock absorbing portion extends in the vehicle width direction from the outer portion to the inner portion. The first shock absorbing portion is disposed to overlap the electric power supply device in vehicle side view.

In general, an electric power supply device mounted in a vehicle is set to have a high rigidity. Accordingly, in the disclosure, some of an impact load input to the rocker panel during a side collision of the vehicle is transmitted to the electric power supply device side via the first shock absorbing portion by the first shock absorbing portion of the rocker panel being disposed to overlap the electric power supply device in vehicle side view.

The electric power supply device is set to have a high rigidity as described above, and thus the rocker panel obtains a reaction force from the electric power supply device once some of the impact load input to the rocker panel is transmitted to the electric power supply device. As a result, the first shock absorbing portion of the rocker panel undergoes plastic deformation and impact energy is absorbed. In other words, the impact load can be effectively reduced even in the event of a short stroke.

As a result, intrusion (so-called inward folding) of the rocker panel to the inner side in the vehicle width direction can be suppressed. In other words, in the disclosure, inward folding of the rocker panel is suppressed even in a case where a large load is locally input with respect to the rocker panel as in a so-called pole side collision.

As described above, in the disclosure, inward folding of the rocker panel is suppressed by the use of the reaction force from the electric power supply device by the first shock absorbing portion being disposed in the closed sectional portion of the rocker panel and the first shock absorbing portion being disposed to overlap the electric power supply device in vehicle side view. In other words, in the disclosure, no separate member is needed, unlike in the related art, in suppressing inward folding of the rocker panel. In the disclosure, the impact load can be effectively reduced even in the event of a short stroke, and thus inward folding of the rocker panel can be suppressed irrespective of the dimension of the electric power supply device.

The vehicle lower portion structure according to the first aspect of the disclosure may further include a floor cross member disposed between the rocker panels above the floor panel and extending along the vehicle width direction. The rocker panel may be configured to further include a second shock absorbing portion extending in the vehicle width direction from the outer portion to the inner portion in the closed sectional portion and disposed to overlap the floor cross member in vehicle side view.

In the vehicle lower portion structure according to the first aspect of the disclosure, the floor cross member extends along the vehicle width direction between the rocker panels above the floor panel. Between the outer portion and the inner portion in the closed sectional portion of the rocker panel, the second shock absorbing portion extends in the vehicle width direction to overlap the floor cross member in vehicle side view.

Accordingly, some of the impact load input to the rocker panel is transmitted to the floor cross member side via the second shock absorbing portion during the side collision of the vehicle. Once the impact load is input to the floor cross member, the rocker panel obtains a reaction force from the floor cross member (strictly speaking, the rocker panel on the side opposite to the rocker panel to which the impact load is input through the floor cross member). As a result, the second shock absorbing portion undergoes plastic deformation and impact energy is absorbed. In other words, in the disclosure, impact energy can be further absorbed by the plastic deformation of the first shock absorbing portion and the second shock absorbing portion.

Herein, a load transmission path for transmission to the electric power supply device side via the first shock absorbing portion of the rocker panel and a load transmission path for transmission to the floor cross member side via the second shock absorbing portion of the rocker panel during the side collision of the vehicle can be formed. Accordingly, load dispersion can be aimed for regarding the impact load input to the rocker panel.

In other words, in the disclosure, inward folding of the rocker panel is suppressed by the use of the reaction force from the electric power supply device and the reaction force from the floor cross member by the first shock absorbing portion and the second shock absorbing portion being disposed in the closed sectional portion of the rocker panel and the first shock absorbing portion and the second shock absorbing portion being disposed to overlap the electric power supply device and the floor cross member in vehicle side view, respectively.

In the vehicle lower portion structure according to the first aspect of the disclosure, the electric power supply device may be a storage battery, the storage battery may be provided with a battery case accommodating a plurality of battery modules, and a first cross member extending along the vehicle width direction may be disposed to overlap the first shock absorbing portion in vehicle side view in the battery case.

In the vehicle lower portion structure according to the first aspect of the disclosure, the storage battery is provided with the battery case accommodating the battery modules and the first cross member extends along the vehicle width direction in the battery case. As a result, the rigidity of the battery case itself is improved. In the disclosure, the first cross member is set to be to overlap the first shock absorbing portion in vehicle side view.

Accordingly, once the impact load is input to the rocker panel during the side collision of the vehicle, the impact load is transmitted to the first cross member side of the battery case via the first shock absorbing portion. Once the impact load is transmitted to the first cross member side of the battery case, the rocker panel obtains a reaction force from the first cross member (strictly speaking, the rocker panel on the side opposite to the rocker panel to which the impact load is input through the first cross member and the battery case) and the first shock absorbing portion undergoes plastic deformation. As a result, impact energy is absorbed and the impact load can be effectively reduced even in the event of a short stroke.

As described above, in the disclosure, the first shock absorbing portion is disposed in the closed sectional portion of the rocker panel and the position of the first cross member of the battery case is set to overlap the first shock absorbing portion in vehicle side view. Accordingly, the reaction force from the first cross member can be used and inward folding of the rocker panel can be suppressed.

In the vehicle lower portion structure according to the first aspect of the disclosure, the first shock absorbing portion may be configured to include a first lateral wall extending in the vehicle width direction and the first cross member may be configured to include a second lateral wall overlapping the first lateral wall extending in the vehicle width direction in vehicle side view.

In the vehicle lower portion structure according to the first aspect of the disclosure, the first shock absorbing portion is configured to include the first lateral wall extending in the vehicle width direction and the first cross member is configured to include the second lateral wall extending in the vehicle width direction.

In the disclosure, the second lateral wall of the first cross member is provided to overlap the first lateral wall of the first shock absorbing portion in vehicle side view. As a result, once the impact load is input to the rocker panel during the side collision of the vehicle, the impact load is transmitted to the second lateral wall side of the first cross member of the battery case via the first lateral wall of the first shock absorbing portion.

As described above, in the disclosure, the second lateral wall constituting at least a part of the first cross member of the battery case is disposed to overlap the first lateral wall constituting at least a part of the first shock absorbing portion of the rocker panel in vehicle side view, and thus the reaction force from the first cross member can be effectively obtained.

In the vehicle lower portion structure according to the first aspect of the disclosure, the first shock absorbing portion may include a third lateral wall extending in the vehicle width direction and disposed in parallel to the first lateral wall and a first connecting wall connecting the first lateral wall and the third lateral wall to each other between the first lateral wall and the third lateral wall.

In the vehicle lower portion structure according to the first aspect of the disclosure, the electric power supply device may be a fuel cell, the fuel cell may be provided with a tank case in which fuel tanks disposed along the vehicle width direction are arranged along the vehicle front-rear direction, and a second cross member partitioning the fuel tanks disposed next to each other in the vehicle front-rear direction from each other and extending along the vehicle width direction to overlap the first shock absorbing portion in vehicle side view may be disposed in the tank case.

In the vehicle lower portion structure according to the first aspect of the disclosure, the fuel cell according to the first aspect of the disclosure is provided with the tank case in which the fuel tanks disposed along the vehicle width direction are arranged along the vehicle front-rear direction. The second cross member extends along the vehicle width direction in the tank case, and the fuel tanks disposed next to each other in the vehicle front-rear direction are partitioned from each other by the second cross member. The rigidity of the tank case itself is improved by the second cross member being disposed in the tank case as described above.

In the vehicle lower portion structure according to the first aspect of the disclosure, the first shock absorbing portion may be configured to include a fourth lateral wall extending in the vehicle width direction and the second cross member may be configured to include a fifth lateral wall overlapping the fourth lateral wall extending in the vehicle width direction in vehicle side view.

A second aspect of the disclosure relates to a vehicle lower portion structure including a pair of rocker panels, and a floor cross member. The rocker panels extend along a vehicle front-rear direction, and are respectively arranged on both outer sides of a vehicular floor panel in a vehicle width direction. The floor cross member is disposed between the rocker panels above the floor panel and extends along the vehicle width direction. The rocker panel is configured to include an outer portion, an inner portion, and a third shock absorbing portion. The outer portion is positioned on an outer side in the vehicle width direction. The inner portion is formed integrally with the outer portion, is positioned inward of the outer portion in the vehicle width direction, and forms a closed sectional portion with the outer portion. The third shock absorbing portion extends in the vehicle width direction from the outer portion to the inner portion in the closed sectional portion and is disposed to overlap the floor cross member in vehicle side view.

In the vehicle lower portion structure according to the second aspect of the disclosure, the rocker panels are respectively arranged on both outer sides of the vehicular floor panel in the vehicle width direction and each of the rocker panels extends along the vehicle front-rear direction. The floor cross member extends along the vehicle width direction between the rocker panels above the floor panel.

In the rocker panel according to the second aspect of the disclosure, the outer portion positioned on the outer side in the vehicle width direction and the inner portion positioned on an inner side in the vehicle width direction are formed integrally with each other and the outer portion and the inner portion form the closed sectional portion. By the outer portion and the inner portion being formed integrally with each other in the rocker panel as described above, the rigidity of the rocker panel itself can be higher than in a case where, for example, a rocker panel is formed by two, outer and inner, panels being coupled with each other.

Between the outer portion and the inner portion in the closed sectional portion of the rocker panel, the third shock absorbing portion extends in the vehicle width direction to overlap the floor cross member in vehicle side view. Accordingly, once an impact load is input to the rocker panel during a side collision of the vehicle, some of the impact load is transmitted to the floor cross member side via the third shock absorbing portion.

Once some of the impact load is transmitted to the floor cross member side as described above, the rocker panel obtains a reaction force from the floor cross member (strictly speaking, the rocker panel on the side opposite to the rocker panel to which the impact load is input through the floor cross member) and the third shock absorbing portion undergoes plastic deformation. As a result, impact energy is absorbed. In other words, the impact load can be effectively reduced even in the event of a short stroke.

As described above, in the disclosure, inward folding of the rocker panel is suppressed by the use of the reaction force from the floor cross member by the third shock absorbing portion being disposed in the closed sectional portion of the rocker panel and the third shock absorbing portion being disposed to overlap the floor cross member in vehicle side view.

The vehicle lower portion structure according to the second aspect of the disclosure may include an electric power supply device arranged below the floor panel.

As described above, in the vehicle lower portion structure according to the second aspect of the disclosure, the impact load input to the rocker panel is transmitted to the floor cross member side arranged above the floor panel during the side collision of the vehicle. Accordingly, in the vehicle lower portion structure according to the first aspect of the disclosure, the electric power supply device is arranged below the floor panel. As a result, input of the impact load to the electric power supply device arranged below the floor panel can be forestalled. Examples of the material of the "electric power supply device" include hydrogen and alcohol.

In the vehicle lower portion structure according to the second aspect of the disclosure, the electric power supply device may be a storage battery.

In the vehicle lower portion structure according to the second aspect of the disclosure, the electric power supply device may be a fuel cell.

In the vehicle lower portion structure according to the second aspect of the disclosure, the third shock absorbing portion may be configured to include a sixth lateral wall extending in the vehicle width direction and the floor cross member may be configured to include a seventh lateral wall overlapping the sixth lateral wall extending in the vehicle width direction in vehicle side view.

In the vehicle lower portion structure according to the second aspect of the disclosure, the third shock absorbing portion may include an eighth lateral wall extending in the vehicle width direction and disposed in parallel to the sixth lateral wall and a second connecting wall connecting the sixth lateral wall and the eighth lateral wall to each other between the sixth lateral wall and the eighth lateral wall.

The vehicle lower portion structure according to the second aspect of the disclosure may further include a tunnel portion protruding toward an inside of a vehicle cabin and extending along the vehicle front-rear direction in a middle portion of the floor panel in the vehicle width direction. The floor cross member may extends between the rocker panels with the tunnel portion between the rocker panels.

In the vehicle lower portion structure according to the second aspect of the disclosure, the tunnel portion protruding toward the inside of the vehicle cabin and extending along the vehicle front-rear direction is disposed in the middle portion of the floor panel in the vehicle width direction.

The "floor cross member extending in the vehicle width direction between the rocker panels with the tunnel portion between the rocker panels" includes a case where the floor cross member is divided by the tunnel portion and two floor cross members are disposed along the vehicle width direction as well as a case where the floor cross member is formed along the shape of the tunnel portion and one floor cross member is disposed along the vehicle width direction.

In the case of the former, both ends of the floor cross member in a longitudinal direction are coupled with the rocker panels on both end sides of the floor panel in the vehicle width direction. Accordingly, the rocker panel to which the impact load is input obtains a reaction force from the rocker panel on the side opposite to the rocker panel to which the impact load is input by the transmission load transmitted to the floor cross member via the rocker panel.

In the case of the latter, one end of the floor cross member in the longitudinal direction is coupled with the rocker panel on one end side of the floor panel in the vehicle width direction and the other end of the floor cross member in the longitudinal direction is coupled with the tunnel portion. Accordingly, the rocker panel to which the impact load is input obtains a reaction force from the tunnel portion by the transmission load transmitted to the floor cross member via the rocker panel. Accordingly, in this case, it is desirable that the rigidity of the tunnel portion itself is increased by, for example, a reinforcing member being arranged in the tunnel portion.

As described above, in the disclosure, the impact load can be effectively reduced even in the event of a short stroke, and thus a large-capacity fuel cell can be arranged below the tunnel portion.

The vehicle lower portion structure according to the second aspect of the disclosure may further include a fourth shock absorbing portion extending in the vehicle width direction from the outer portion to the inner portion in the closed sectional portion and disposed to overlap the electric power supply device in vehicle side view.

In the disclosure, the second cross member is provided to overlap the fourth shock absorbing portion in vehicle side view. Accordingly, once the impact load is input to the rocker panel during the side collision of the vehicle, the impact load is transmitted to the second cross member side of the tank case via the fourth shock absorbing portion.

Once the impact load is transmitted to the second cross member side of the tank case, the rocker panel obtains a reaction force from the second cross member (strictly speaking, the rocker panel on the side opposite to the rocker panel to which the impact load is input through the second cross member and the tank case) and the fourth shock absorbing portion undergoes plastic deformation. As a result, impact energy is absorbed and the impact load can be effectively reduced even in the event of a short stroke.

As described above, in the disclosure, the fourth shock absorbing portion is disposed in the closed sectional portion of the rocker panel and the position of the second cross member of the tank case is set to overlap the fourth shock absorbing portion in vehicle side view. Accordingly, the reaction force from the second cross member can be used and inward folding of the rocker panel can be suppressed.

As described above, the vehicle lower portion structure according to the first aspect of the disclosure has an effect in that inward folding of the rocker panel can be suppressed with an increase in cost suppressed.

In addition, the vehicle lower portion structure according to the first aspect of the disclosure has an effect in that the impact load can be effectively reduced even in the event of a short stroke.

Furthermore, the vehicle lower portion structure according to the first aspect of the disclosure has an effect in that inward folding of the rocker panel can be suppressed by the use of the reaction force from the first cross member.

The vehicle lower portion structure according to the second aspect of the disclosure has an effect in that inward folding of the rocker panel can be suppressed with an increase in cost suppressed.

In addition, the vehicle lower portion structure according to the second aspect of the disclosure has an effect in that impact load transmission to the fuel cell can be forestalled.

Furthermore, the vehicle lower portion structure according to the second aspect of the disclosure has an effect in that a large-capacity fuel cell can be arranged.

Moreover, the vehicle lower portion structure according to the second aspect of the disclosure has an effect in that inward folding of the rocker panel can be suppressed by the use of the reaction force from the second cross member.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, a vehicle lower portion structure according to embodiments will be described with reference to accompanying drawings. The arrows FR, UP, and RH that are appropriately shown in each of the drawings represent the forward direction, the upward direction, and the rightward direction of a vehicle to which the vehicle floor portion structure according to an embodiment is applied, respectively. Unless otherwise noted, the front-rear, up-down, and right-left directions in the following description refer to the front and rear in the vehicle front-rear direction, the top and bottom in the vehicle up-down direction, and the right and left in a case where the vehicle is in the forward direction, respectively.

First Embodiment

Configuration of Vehicle Lower Portion Structure

Figure 1:
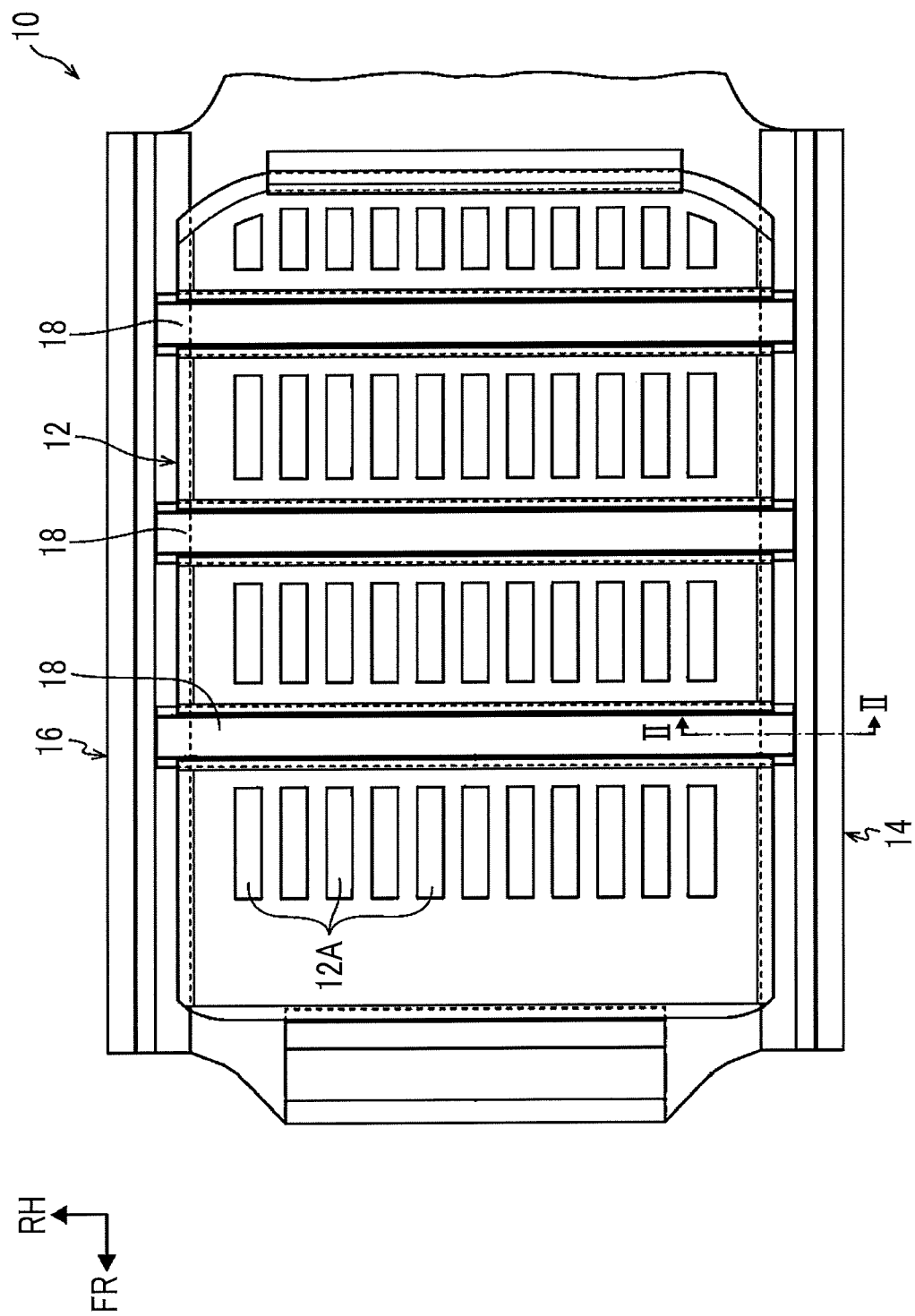
FIG. 1 is a plan view of a vehicle lower portion to which a vehicle lower portion structure according to a first embodiment is applied.

A configuration of the vehicle lower portion structure according to a first embodiment will be described below. FIG. 1 is a plan view of a vehicle lower portion 10 to which the vehicle lower portion structure according to the first embodiment is applied, and FIG. 2 is a cross-sectional view cut along line II-II of FIG. 1.

As illustrated in FIG. 1, a floor panel 12 extends along a vehicle width direction and the vehicle front-rear direction in the vehicle lower portion 10. A bead portion 12A intermittently protrudes along the vehicle front-rear direction in the floor panel 12, and a plurality of the bead portions 12A is arranged along the vehicle width direction. The rigidity of the floor panel 12 itself is improved by the bead portion 12A being formed.

Rocker panels 14, 16 respectively extend along the vehicle front-rear direction at both ends of the floor panel 12 in the vehicle width direction, and a floor cross member 18 extends along the vehicle width direction between the rocker panel 14 and the rocker panel 16 above the floor panel 12. The floor cross member 18 is disposed between the bead portion 12A and the bead portion 12A disposed along the vehicle front-rear direction.

Figure 2:
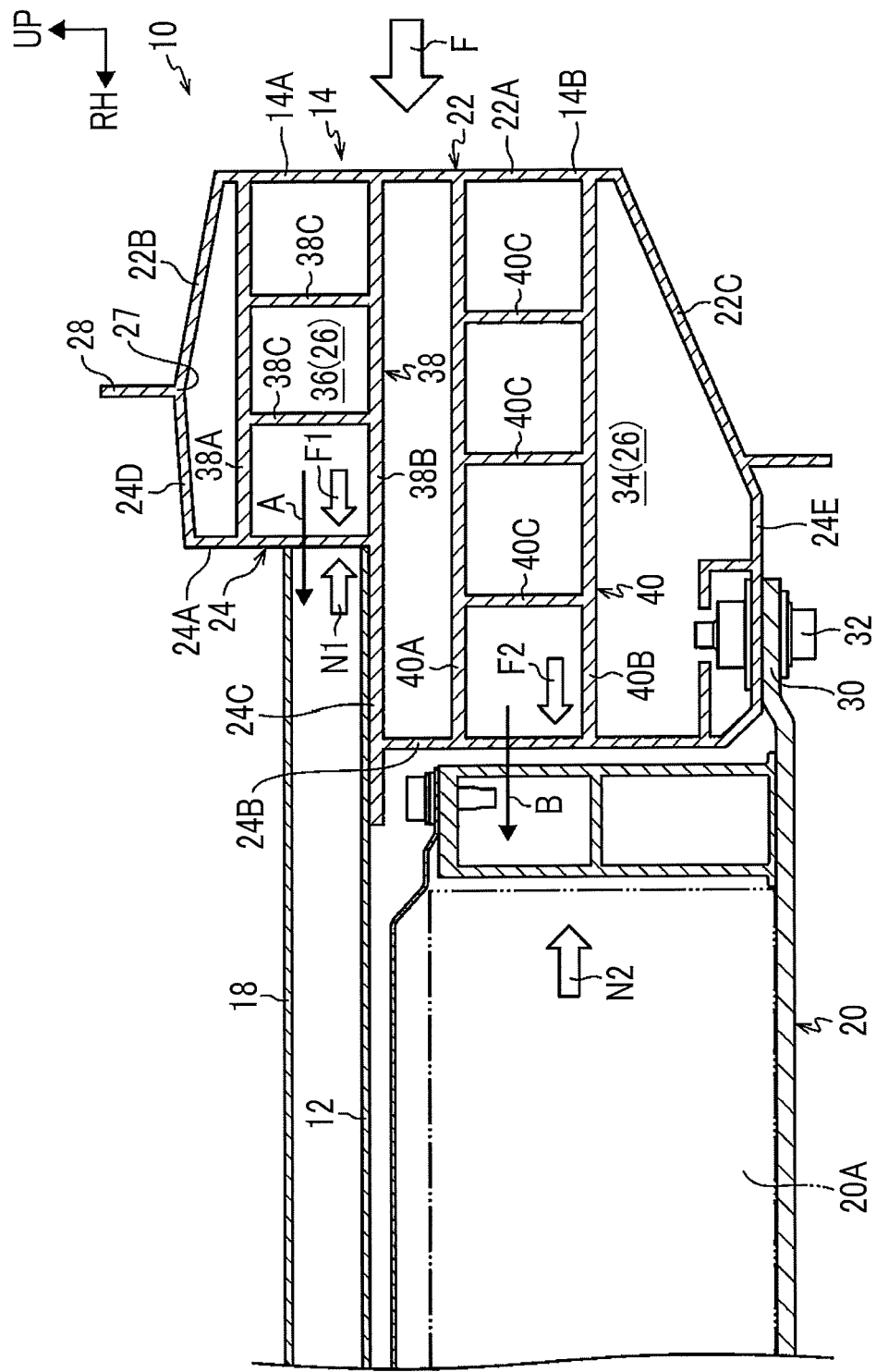
FIG. 2 is a cross-sectional view cut along line II-II of FIG. 1.

As illustrated in FIG. 2, a battery pack (storage battery) 20 is arranged on the lower side of the floor panel 12 as a drive force supply device for supplying electric power to a power unit such as a motor. A lithium-ion battery, a nickel-hydrogen battery, or the like constitutes the battery pack 20.

As described above, the rocker panels 14, 16 respectively extend along the vehicle front-rear direction at both ends of the floor panel 12 in the vehicle width direction. The rocker panels 14, 16 will be described below. The rocker panel 16 has substantially the same configuration as the rocker panel 14, and thus description of the rocker panel 16 will be omitted.

In the first embodiment, the rocker panel 14 is configured to include an outer portion 22 positioned on the outer side in the vehicle width direction and an inner portion 24 positioned on the inner side in the vehicle width direction as illustrated in FIG. 2. The rocker panel 14 is formed of a metal such as an aluminum alloy. The outer portion 22 and the inner portion 24 are formed integrally with each other by extrusion, drawing, or the like, and the outer portion 22 and the inner portion 24 form a closed sectional portion 26.

The outer portion 22 is configured to include an outer wall portion 22A, an inclined upper wall portion 22B, and an inclined lower wall portion 22C. In a sectional shape cut along the vehicle width direction, the outer wall portion 22A is formed along the vehicle up-down direction, the inclined upper wall portion 22B is disposed on the upper side of the outer wall portion 22A and is inclined toward the upper side as the inclined upper wall portion 22B heads for the inner side in the vehicle width direction, and the inclined lower wall portion 22C is disposed on the lower side of the outer wall portion 22A and is inclined toward the lower side as the inclined lower wall portion 22C heads for the inner side in the vehicle width direction.

The inner portion 24 is configured to include an upper inner wall portion 24A and a lower inner wall portion 24B. In the sectional shape cut along the vehicle width direction, the upper inner wall portion 24A is formed along the vehicle up-down direction on the upper portion side of the inner portion 24 and the lower inner wall portion 24B is formed along the vehicle up-down direction on the lower portion side of the inner portion 24. The lower inner wall portion 24B is positioned closer to the inner side in the vehicle width direction than the upper inner wall portion 24A, and a lateral wall portion 24C formed along a substantially horizontal direction is disposed between the lower inner wall portion 24B and the upper inner wall portion 24A. Accordingly, the lateral wall portion 24C is formed to be connected to the upper inner wall portion 24A and the lower inner wall portion 24B.

An inclined upper wall portion 24D is disposed on the upper side of the upper inner wall portion 24A. The inclined upper wall portion 24D is inclined toward the upper side as the inclined upper wall portion 24D heads for the outer side in the vehicle width direction. The inclined upper wall portion 24D is formed to be connected to the inclined upper wall portion 22B of the outer portion 22. A flange portion 28 extends toward the upper side from a top portion 27 in which the inclined upper wall portion 24D of the inner portion 24 and the inclined upper wall portion 22B of the outer portion 22 are connected to each other. A lower end portion of a pillar (not illustrated) is coupled with the flange portion 28.

A bottom wall portion 24E formed along the substantially horizontal direction toward the outer side in the vehicle width direction is disposed on the lower side of the lower inner wall portion 24B, and the bottom wall portion 24E is formed to be connected to the inclined lower wall portion 22C of the outer portion 22. A fastener 32 can be inserted into the bottom wall portion 24E. A fixed piece 30 disposed in the battery pack 20 can be fastened and fixed to the rocker panel 14 via the fastener 32.

As described above, the upper inner wall portion 24A of the inner portion 24 is positioned closer to the outer side in the vehicle width direction than the lower inner wall portion 24B. As a result, an upper portion 14A and a lower portion 14B of the rocker panel 14 have different closed sectional portion areas. In other words, the area of a lower closed sectional portion 34 disposed on the lower portion 14B side of the rocker panel 14 exceeds the area of an upper closed sectional portion 36 disposed on the upper portion 14A side of the rocker panel 14 and the rigidity of the lower portion 14B side of the rocker panel 14 is set to exceed the rigidity of the upper portion 14A side of the rocker panel 14.

A ladder-shaped second shock absorbing portion 38 is disposed in the upper closed sectional portion 36 of the rocker panel 14, and the second shock absorbing portion 38 is disposed to overlap the floor cross member 18 in vehicle side view. A ladder-shaped first shock absorbing portion 40 is formed in the lower closed sectional portion 34 of the rocker panel 14, and the first shock absorbing portion 40 is disposed to overlap the battery pack 20 in vehicle side view.

Each of the second shock absorbing portion 38 and the first shock absorbing portion 40 will be described below. The second shock absorbing portion 38 is provided with an upper wall 38A extending along the substantially horizontal direction (vehicle width direction) between the upper inner wall portion 24A of the inner portion 24 and the outer wall portion 22A of the outer portion 22. A lower wall 38B facing the upper wall 38A is formed on the lower side of the upper wall 38A, the lower wall 38B is connected to the lateral wall portion 24C, and the lower wall 38B partitions the upper portion 14A and the lower portion 14B of the rocker panel 14 from each other. Accordingly, the lower wall 38B is also referred to as a "partition wall". A plurality of (two herein) connecting walls 38C extends in the up-down direction between the upper wall 38A and the lower wall 38B.

The first shock absorbing portion 40 is provided with a first lateral wall 40A extending along the substantially horizontal direction (vehicle width direction) between the lower inner wall portion 24B of the inner portion 24 and the outer wall portion 22A of the outer portion 22. A third lateral wall 40B facing the first lateral wall 40A is formed on the lower side of the first lateral wall 40A, and a plurality of (three herein) first connecting walls 40C extends in the up-down direction between the first lateral wall 40A and the third lateral wall 40B.

Action and Effect of Vehicle Lower Portion Structure

The action and effect of the vehicle lower portion structure according to the first embodiment will be described below.

As illustrated in FIG. 2, in the first embodiment, the outer portion 22 and the inner portion 24 are formed integrally with each other in the rocker panel 14 and the outer portion 22 and the inner portion 24 form the closed sectional portion 26.

As a result, the rigidity of the rocker panel 14 itself can be higher than in a case (not illustrated) where, for example, a rocker panel is formed by two, outer and inner, panels being coupled with each other. Welding, fastening, or the like is needed when the two, outer and inner, panels are coupled with each other for the rocker panel to be formed. In the first embodiment, however, processing such as welding and fastening is not needed since the outer portion 22 and the inner portion 24 are formed integrally with each other, and thus cost reduction can be achieved to that extent.

In the first embodiment, the second shock absorbing portion 38 extends in the vehicle width direction to overlap the floor cross member 18 in vehicle side view between the outer portion 22 and the inner portion 24 in the upper portion 14A of the rocker panel 14 (in the upper closed sectional portion 36). In the lower portion 14B of the rocker panel 14 (in the lower closed sectional portion 34), the first shock absorbing portion 40 extends in the vehicle width direction to overlap the battery pack 20 in vehicle side view between the outer portion 22 and the inner portion 24.

Accordingly, once an impact load F is input to the rocker panel 14 during a side collision of the vehicle, some of the impact load F input to the rocker panel 14 is transmitted to the floor cross member 18 side via the second shock absorbing portion 38 disposed on the upper portion 14A side of the rocker panel 14 (transmission load F1) and transmitted to the battery pack 20 side via the first shock absorbing portion 40 disposed on the lower portion 14B side of the rocker panel 14 (transmission load F2).

Once the transmission load F1 is transmitted to the floor cross member 18 via the second shock absorbing portion 38, a reaction force N1 is obtained from the floor cross member 18 (strictly speaking, the rocker panel 16 (refer to FIG. 1) on the side opposite to the rocker panel 14 to which the impact load F is input through the floor cross member 18) in the rocker panel 14. Once the transmission load F2 is transmitted to the battery pack 20 via the first shock absorbing portion 40, a reaction force N2 is obtained from the battery pack 20 (strictly speaking, the rocker panel 16 (refer to FIG. 1) on the side opposite to the rocker panel 14 to which the impact load F is input through the battery pack 20) in the rocker panel 14. As a result, each of the second shock absorbing portion 38 and the first shock absorbing portion 40 undergoes plastic deformation and impact energy is absorbed.

Accordingly, in the first embodiment, the impact load F can be effectively reduced even in the event of a short stroke. Therefore, inward folding of the rocker panel 14 can be suppressed even in a case (not illustrated) where, for example, a large load is locally input with respect to the rocker panel 14 as in a pole side collision. In other words, according to the first embodiment, inward folding of the rocker panel 14 can be suppressed with an increase in cost suppressed.

In the first embodiment, some of the impact load F is transmitted to the floor cross member 18 side via the second shock absorbing portion 38 disposed on the upper portion 14A side of the rocker panel 14 (transmission load F1) and transmitted to the battery pack 20 side via the first shock absorbing portion 40 disposed on the lower portion 14B side of the rocker panel 14 (transmission load F2) as described above once the impact load F is input to the rocker panel 14 during the side collision of the vehicle.

In other words, a load transmission path A for transmission to the floor cross member 18 side via the second shock absorbing portion 38 of the rocker panel 14 and a load transmission path B for transmission to the battery pack 20 side via the first shock absorbing portion 40 of the rocker panel 14 are formed. As a result, load dispersion can be aimed for regarding the impact load F input to the rocker panel 14, and load burden ratios can also be changed in the upper portion 14A of the rocker panel 14 and the lower portion 14B of the rocker panel 14.

Accordingly, the transmission load F2 transmitted to the battery pack 20 side arranged on the lower side of the floor panel 12 can be reduced. According to the above, the rigidity of the battery pack 20 itself can be reduced to the same extent as, for example, the transmission load F2 transmitted to the battery pack 20 side is reduced. In this case, a reduction in the weight of the battery pack 20 can be aimed for by the plate thickness of the battery pack 20 being reduced. The amount by which battery modules 20A accommodated in the battery pack 20 are mounted can be increased to the same extent as the plate thickness of the battery pack 20 is reduced.

Supplementary Matters of First Embodiment

In the first embodiment, the second shock absorbing portion 38 and the first shock absorbing portion 40 may be formed integrally with the rocker panel 14 or may be formed separately from the rocker panel 14. In a case where the second shock absorbing portion 38 and the first shock absorbing portion 40 are formed separately from the rocker panel 14, the second shock absorbing portion 38 and the first shock absorbing portion 40 can be formed of a material that differs from the material of the rocker panel 14, and thus the degree of freedom in mechanical strength design for the rocker panel 14 is improved.

Although each of the second shock absorbing portion 38 and the first shock absorbing portion 40 is formed in a ladder shape in the first embodiment, the shapes of the second shock absorbing portion 38 and the first shock absorbing portion 40 are not limited thereto. The shapes can be appropriately changed in relation to the plate thicknesses of the second shock absorbing portion 38 and the first shock absorbing portion 40. For example, the second shock absorbing portion 38 and the first shock absorbing portion 40 can be formed in a honeycomb shape by the plate thicknesses being reduced. The second shock absorbing portion 38 and the first shock absorbing portion 40 may have different plate thicknesses as well, and the second shock absorbing portion 38 and the first shock absorbing portion 40 do not necessarily have to have the same shape.

Although the second shock absorbing portion 38 is disposed to overlap the floor cross member 18 in vehicle side view and the first shock absorbing portion 40 is disposed to overlap the battery pack 20 in vehicle side view in the rocker panel 14 as described above in the first embodiment, embodiments are not limited thereto.

Figure 3:
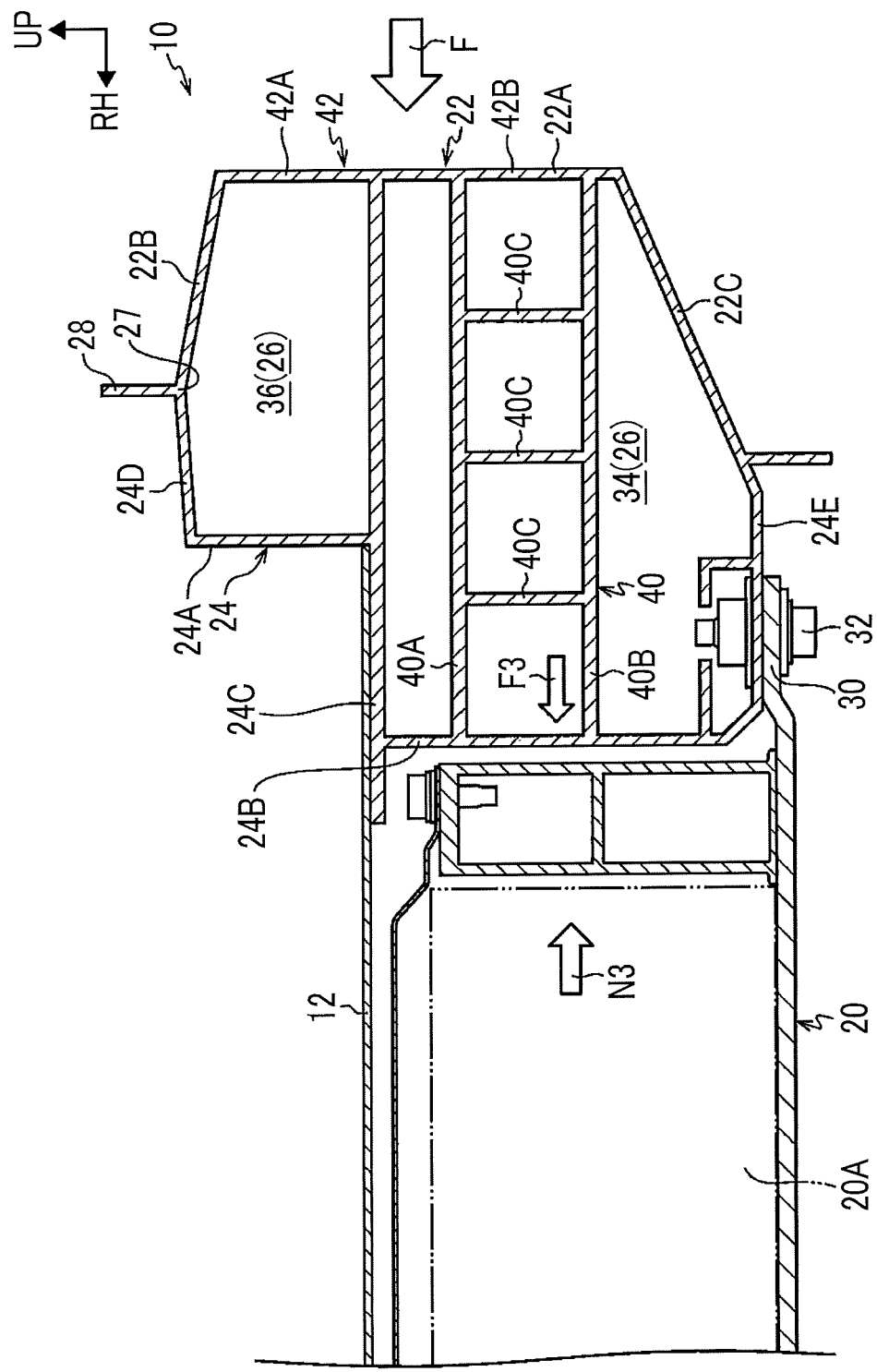
FIG. 3 is a sectional view corresponding to FIG. 2 and illustrating a modification example of the vehicle lower portion structure according to the first embodiment.

In some types of vehicles and depending on vehicles, for example, no floor cross member 18 (refer to FIG. 2) is disposed above the floor panel 12 as illustrated in FIG. 3. In this case, the first shock absorbing portion 40 is disposed on a lower portion 42B side of a rocker panel 42 although the second shock absorbing portion 38 (refer to FIG. 2) is not disposed on an upper portion 42A side of the rocker panel 42 overlapping the floor cross member 18 (refer to FIG. 2) in vehicle side view. Accordingly, once the impact load F is input to the rocker panel 14 during the side collision of the vehicle, some of the impact load F is transmitted to the battery pack 20 side via the first shock absorbing portion 40 (transmission load F3).

Once the impact load (transmission load F3) is transmitted to the battery pack 20 via the first shock absorbing portion 40, a reaction force N3 is obtained from the battery pack 20 in the rocker panel 14. As a result, the first shock absorbing portion 40 undergoes plastic deformation, and thus impact energy is absorbed in this case as well.

Second Embodiment

Figure 4:
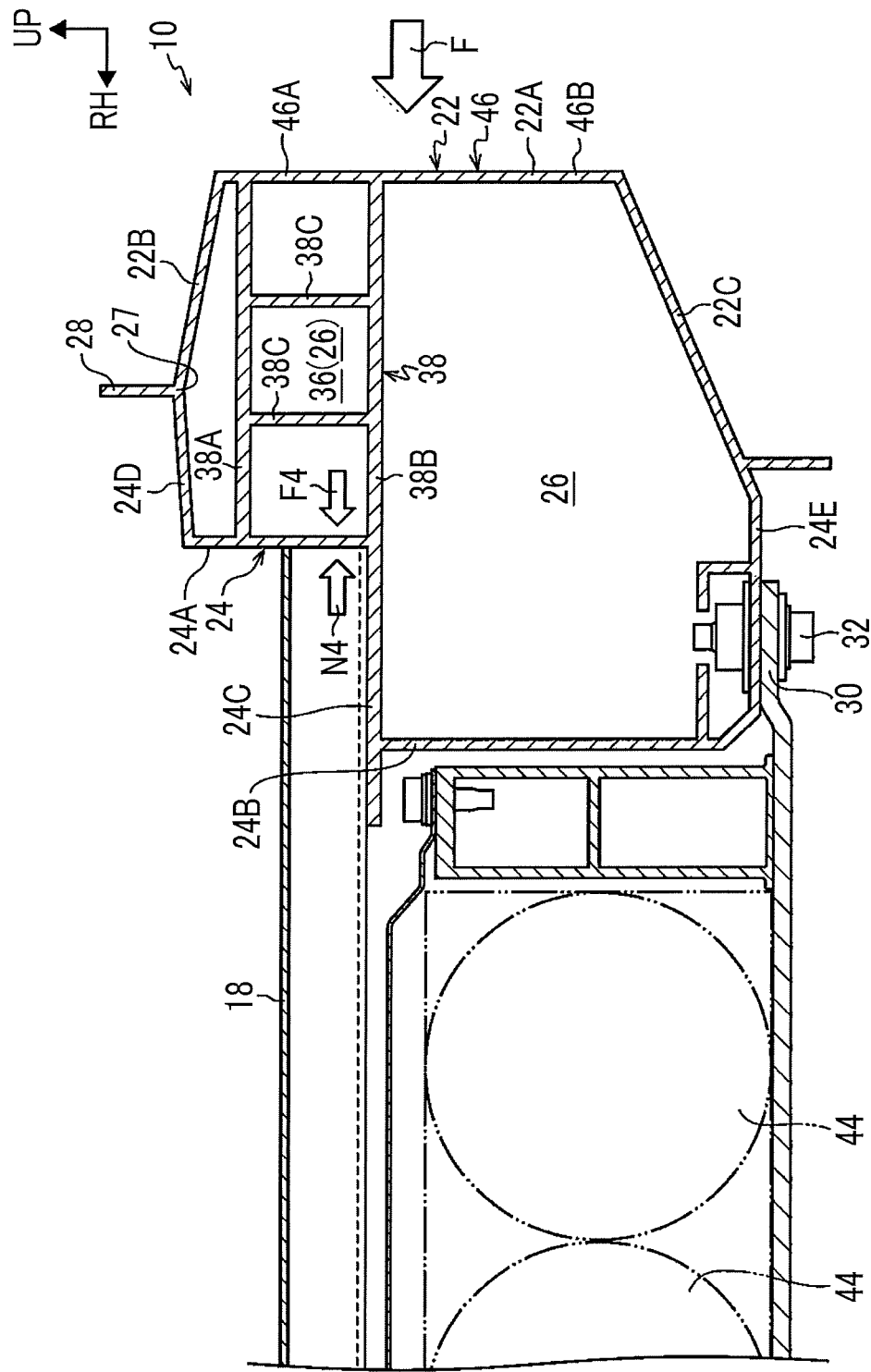
FIG. 4 is a sectional view corresponding to FIG. 2 and illustrating a vehicle lower portion structure according to a second embodiment.

Although a case where the battery pack 20 (refer to FIG. 2) is used as the drive force supply device for supplying the electric power to the power unit has been described in the first embodiment, a case where a hydrogen tank (fuel cell) 44 is used as the drive force supply device as illustrated in FIG. 4 will be described in a second embodiment. Description will be omitted with regard to substantially the same configuration as in the first embodiment.

In the second embodiment, the second shock absorbing portion 38 is disposed at a position (on an upper portion 46A side of a rocker panel 46) not overlapping the hydrogen tank 44 in vehicle side view in the rocker panel 46 as illustrated in FIG. 4.

In this case, some of the impact load F is transmitted to the floor cross member 18 side via the second shock absorbing portion 38 disposed on the upper portion 46A side of the rocker panel 46 (transmission load F4) once the impact load F is input to the rocker panel 46 during the side collision of the vehicle. Once the transmission load F4 is transmitted to the floor cross member 18 via the second shock absorbing portion 38, a reaction force N4 is obtained from the floor cross member 18 in the rocker panel 46. As a result, the second shock absorbing portion 38 undergoes plastic deformation and impact energy is absorbed.

Therefore, according to the second embodiment, the impact load F can be effectively reduced even in the event of a short stroke and intrusion of the rocker panel 46 to the inner side in the vehicle width direction can be suppressed.

In the second embodiment, input of the impact load F to the hydrogen tank 44 side arranged on the lower side of the floor panel 12 can be forestalled.

Supplementary Matters of Second Embodiment

Figure 5:
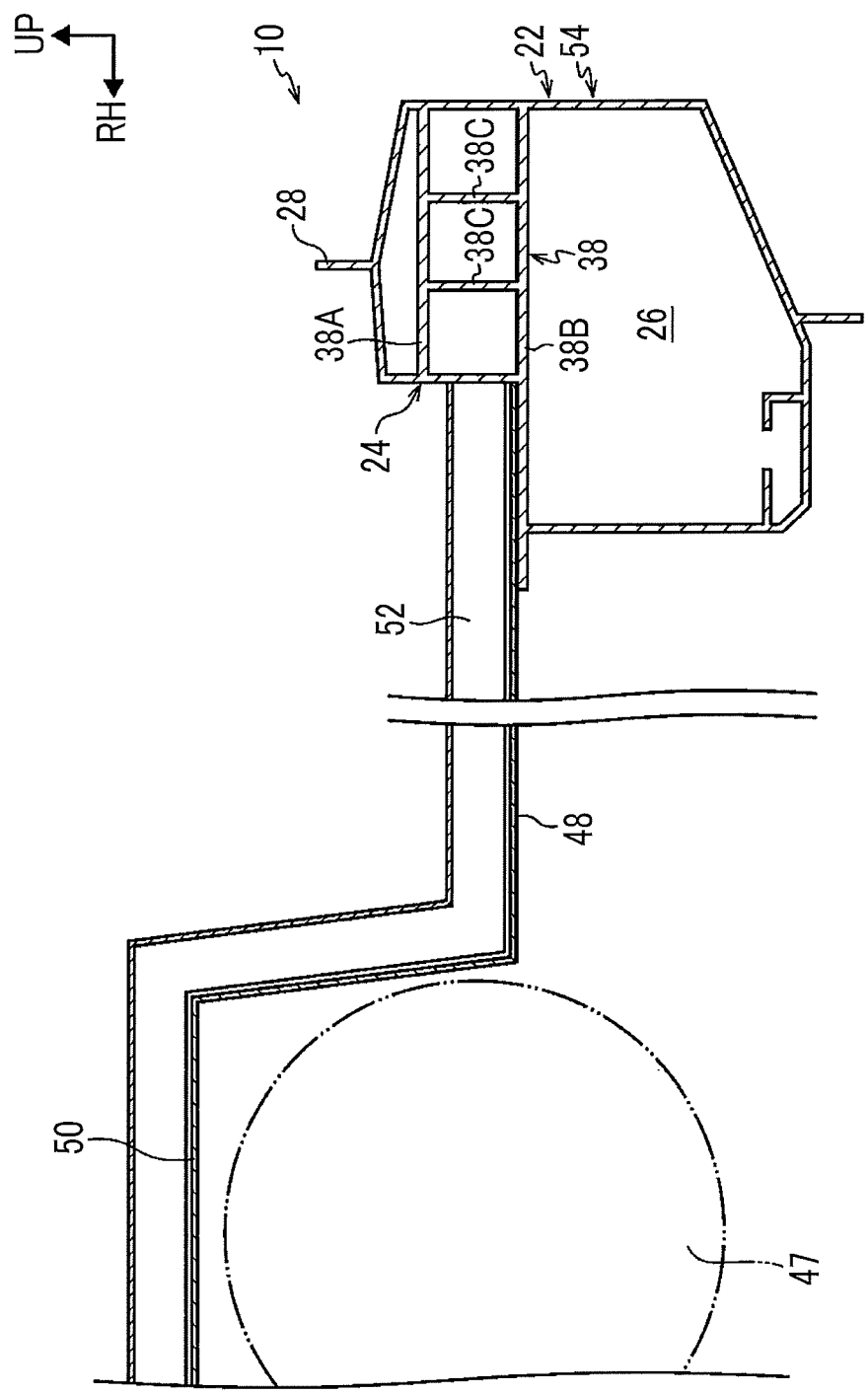
FIG. 5 is a sectional view corresponding to FIG. 2 and illustrating a first modification example of the vehicle lower portion structure according to the second embodiment.

Although the floor cross member 18 extends between the rocker panels 14, 16 as illustrated in FIG. 1 in the embodiment above, a hydrogen tank (fuel cell) 47 may be arranged along the vehicle front-rear direction on the lower side of a tunnel portion 50 protruding along the vehicle front-rear direction in the middle portion of a floor panel 48 in the vehicle width direction in a case where, for example, the hydrogen tank 47 has a large diameter as illustrated in FIG. 5.

In this case, a floor cross member 52 extends between a pair of rocker panels 54 arranged at both ends of the floor panel 48 in the vehicle width direction with the tunnel portion 50 between the rocker panels 54. Although the floor cross member 52 is formed along the shape of the tunnel portion 50 herein, the present disclosure is not limited thereto.

For example, two floor cross members may also be disposed along the vehicle width direction after the floor cross member is divided by the tunnel portion although this is not illustrated. In this case, one end of the floor cross member in a longitudinal direction is coupled with the rocker panel and the other end of the floor cross member in the longitudinal direction is coupled with the tunnel portion. Accordingly, the rocker panel allows a reaction force from the tunnel portion to be obtained by the transmission load that is transmitted from the rocker panel to the floor cross member. Accordingly, in this case, it is desirable that the rigidity of the tunnel portion itself is increased by, for example, a reinforcing member being arranged in the tunnel portion.

Although vehicles in which the battery pack 20 (refer to FIG. 2) and the hydrogen tank 44 (refer to FIG. 4) are used as the drive force supply device have been described in the embodiments above, the second embodiment is also applicable with respect to gasoline cars.

Figure 6:
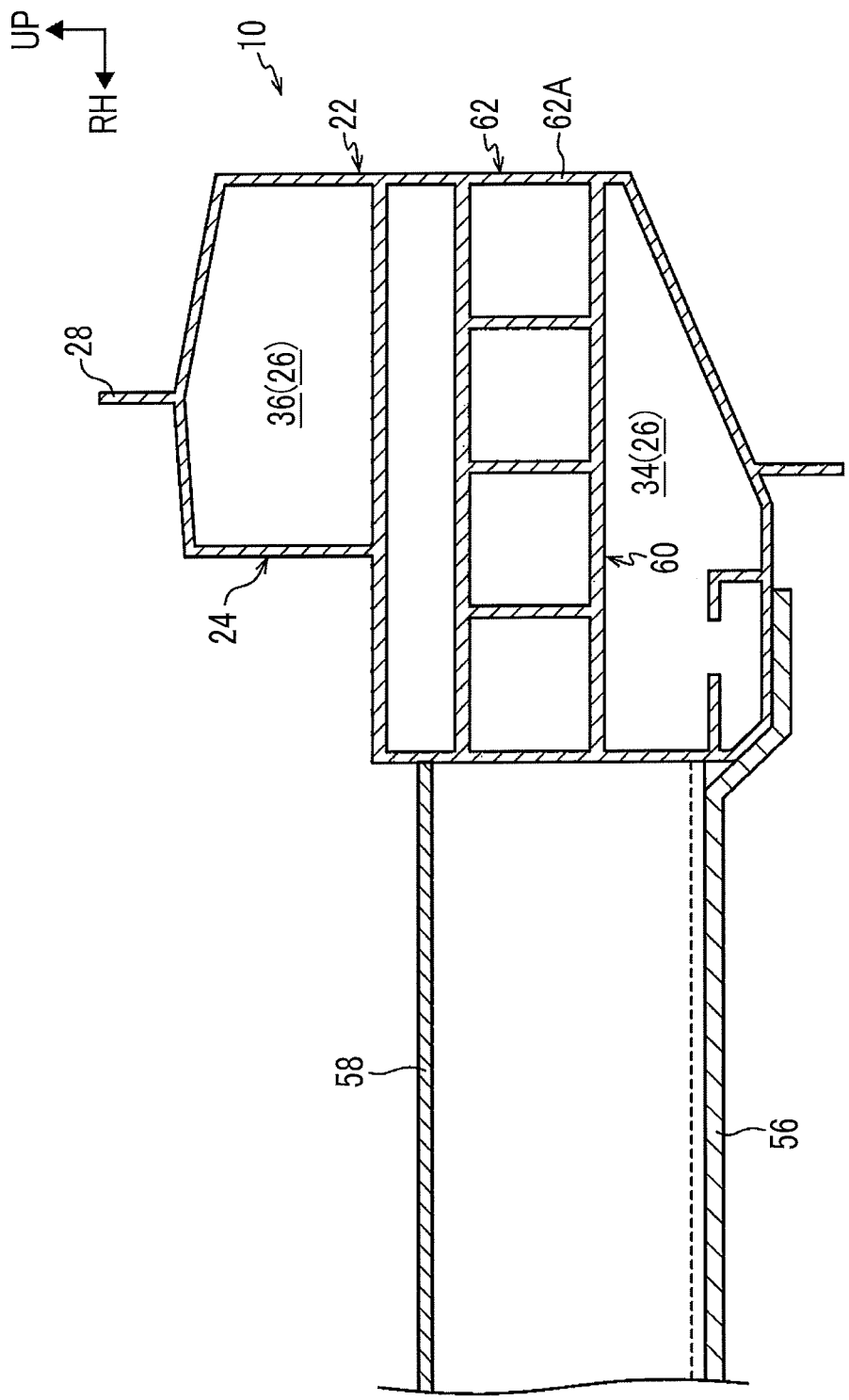
FIG. 6 is a sectional view corresponding to FIG. 2 and illustrating a second modification example of the vehicle lower portion structure according to the second embodiment.

In the case of gasoline cars, no drive force supply device needs to be arranged on the lower side of a floor panel 56 as illustrated in, for example, FIG. 6. Accordingly, the position of the floor panel 56 in the up-down direction can be set low. Therefore, a third shock absorbing portion 60 disposed to overlap a floor cross member 58 arranged above the floor panel 56 in vehicle side view is disposed on a lower portion 62A side of a rocker panel 62.

Third Embodiment

Configuration of Third Embodiment

A configuration of a vehicle lower portion structure according to a third embodiment will be described below. In the first embodiment, the ladder-shaped second shock absorbing portion 38 overlapping the floor cross member 18 in vehicle side view is disposed in the upper closed sectional portion 36 of the rocker panel 14 as illustrated in FIG. 2. The battery pack 20 is arranged on the lower side of the floor panel 12, and the ladder-shaped first shock absorbing portion 40 overlapping the battery pack 20 in vehicle side view is disposed in the lower closed sectional portion 34 of the rocker panel 14.

Figure 7:
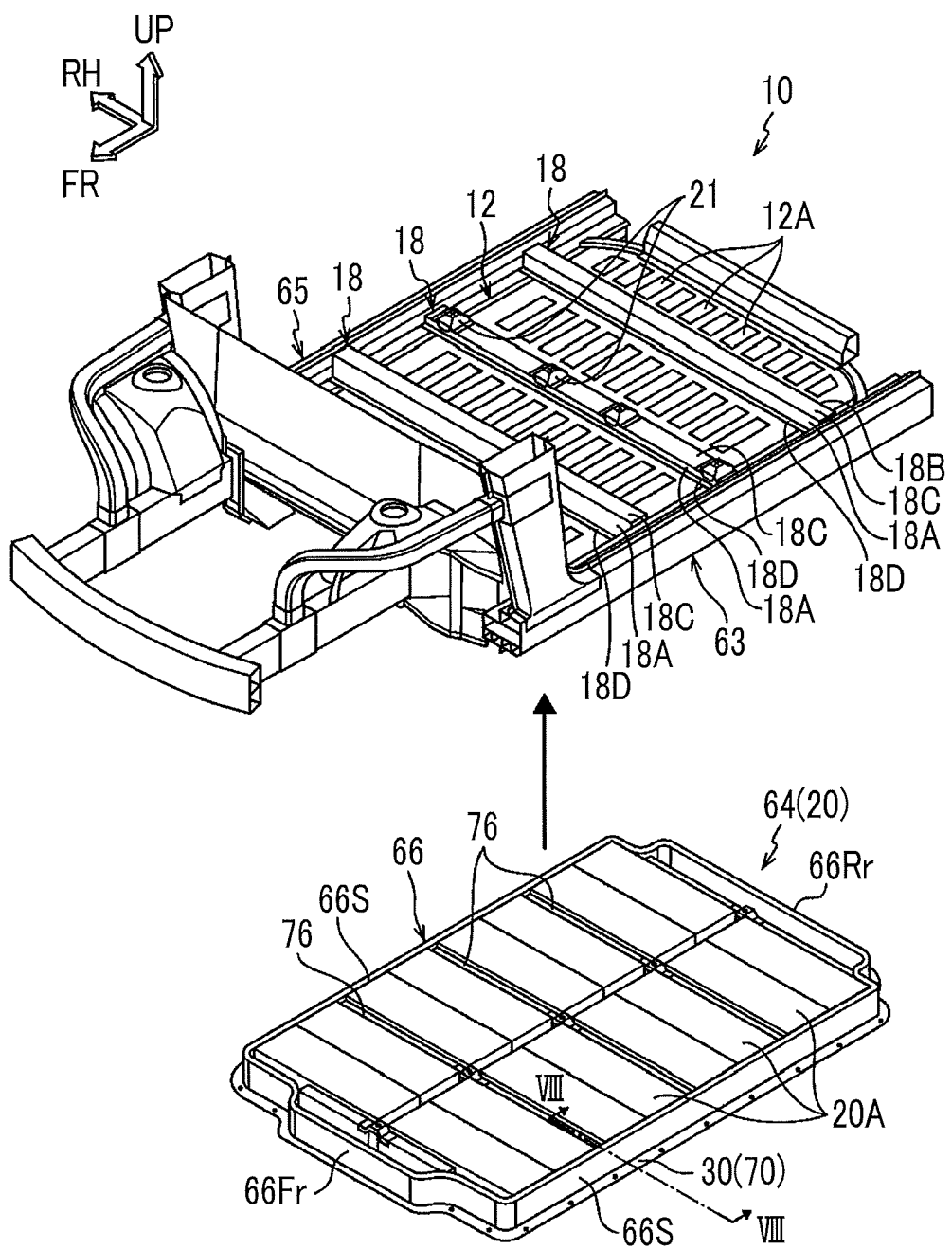
FIG. 7 is an exploded perspective view illustrating a battery pack and a vehicle lower portion to which a vehicle lower portion structure according to a third embodiment is applied.
Figure 8:
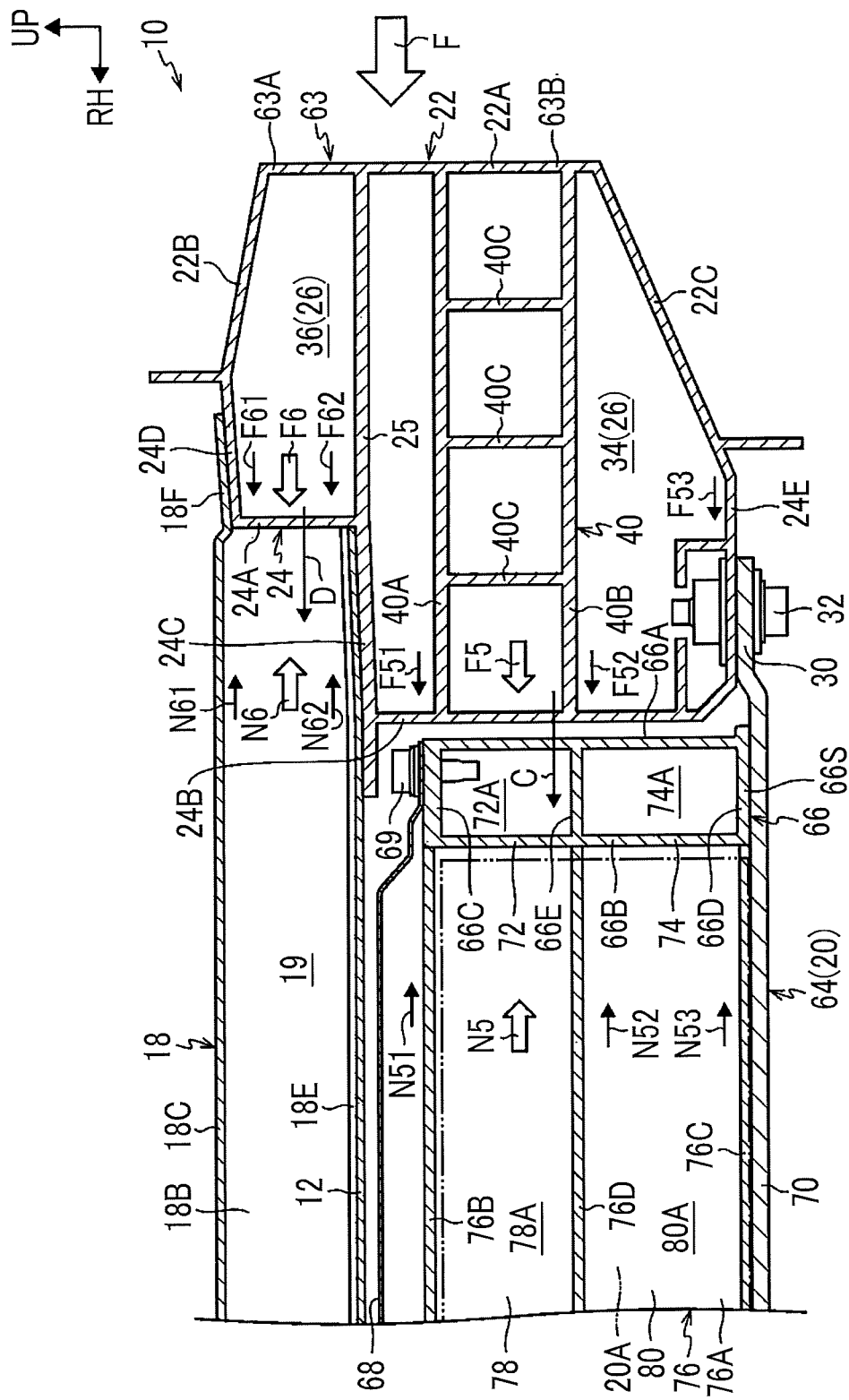
FIG. 8 is a cross-sectional view cut along line VIII-VIII of the battery pack including the vehicle lower portion illustrated in FIG. 7.

In the third embodiment, in contrast, no ladder-shaped second shock absorbing portion 38 (refer to FIG. 2) is disposed in the upper closed sectional portion 36 of a rocker panel 63 although the ladder-shaped first shock absorbing portion 40 is disposed in the lower closed sectional portion 34 of the rocker panel 63 as illustrated in FIG. 8. In the following description, description will be omitted with regard to substantially the same configuration as in the first embodiment. A rocker panel 65 illustrated in FIG. 7 is substantially similar in configuration to the rocker panel 63, and thus description will be omitted as in the first embodiment.

To be more specific with regard to the third embodiment, the lateral wall portion 24C connecting the upper inner wall portion 24A and the lower inner wall portion 24B constituting a part of the inner portion 24 of the rocker panel 63 and formed along the vehicle up-down direction to each other along the substantially horizontal direction connects the inner portion 24 and the outer portion 22 to each other by extending to the outer portion 22 side of the rocker panel 63. In other words, a partition wall 25 partitioning an upper portion 63A and a lower portion 63B of the rocker panel 63 from each other is disposed along the substantially horizontal direction. Although the partition wall 25 and the lateral wall portion 24C are integrally formed, the partition wall 25 and the lateral wall portion 24C have different names so that confusion is avoided.

Although the lateral wall portion 24C is slightly inclined toward the lower side as the lateral wall portion 24C heads for the inner side in the vehicle width direction, the lateral wall portion 24C is formed along the substantially horizontal direction in a tip portion. Although three first connecting walls 40C are disposed in the first shock absorbing portion 40, the present disclosure is not limited thereto and the number may be four or more as well. In a case where the number of the first connecting walls 40C is increased at the same plate thickness, the rigidity of the first shock absorbing portion 40 itself can be improved and the amount of energy absorbed when the impact load is input can be increased.

As illustrated in FIG. 7, the floor cross member 18 is configured to include a front wall portion 18A disposed in a front portion in the vehicle front-rear direction, a rear wall portion 18B disposed in a rear portion in the vehicle front-rear direction, and an upper wall portion 18C connecting the upper end of the front wall portion 18A and the upper end of the rear wall portion 18B to each other in the vehicle horizontal direction. A plurality of the floor cross members 18 is illustrated in FIG. 7, and a bracket 21 for a seat for an occupant to sit on is attached to the upper wall portion 18C of one of the floor cross members 18 that is in the middle portion in the vehicle front-rear direction. Accordingly, the upper wall portion 18C is lower in height-direction position than the upper wall portions 18C of the other floor cross members 18.

A flange portion 18D extends toward the front side from the lower end of the front wall portion 18A of the floor cross member 18, and a flange portion 18E (refer to FIG. 8) extends toward the rear side from the lower end of the rear wall portion 18B. Each of the flange portions 18D, 18E is bonded to the floor panel 12. As a result, a closed sectional portion 19 (refer to FIG. 8) is formed between the floor cross member 18 and the floor panel 12.

As illustrated in FIG. 8, an upper flange portion 18F extends toward the outer side in the vehicle width direction from each end of the upper wall portion 18C of the floor cross member 18 in the vehicle width direction. The upper flange portion 18F is bonded to the upper surface of the inclined upper wall portion 24D of the inner portion 24 constituting a part of the upper closed sectional portion 36 of the rocker panel 63. Although not illustrated, flange portions respectively extend toward the front side and the rear side from both ends of the front wall portion 18A (refer to FIG. 7) and the rear wall portion 18B of the floor cross member 18 in the vehicle width direction and each of the flange portions is bonded to the upper inner wall portion 24A of the inner portion 24.

As illustrated in FIG. 7, in the third embodiment, the battery pack (storage battery) 20 that a lithium-ion battery, nickel-hydrogen battery, or the like constitutes is provided with a battery case 64 that has the vehicle front-rear direction as the longitudinal direction of the battery case 64 and is formed in a box shape which is flat in the vehicle up-down direction and the battery modules 20A that are accommodated in the battery case 64. A plurality of prismatic storage batteries constitutes the battery modules 20A.

As illustrated in FIGS. 7 and 8, the battery case 64 has a peripheral wall 66 constituting the outer shape of the battery case 64, a top plate 68 (not illustrated in FIG. 7) constituting the lid portion of the battery case 64, and a bottom plate 70 constituting the bottom portion of the battery case 64.

The peripheral wall 66 is formed by an elongated extrusion-molded article formed by extrusion molding of a light metal such as an aluminum alloy being bent in a rectangular frame shape and both end portions of the extrusion-molded article in a longitudinal direction being bonded to each other. The peripheral wall 66 has a substantially rectangular frame shape in plan view. The top plate 68 is formed by press molding being performed on a plate material formed of a light metal such as an aluminum alloy. The top plate 68 is fixed to the upper surface of an upper wall portion 66C of the peripheral wall 66 via a plurality of bolts 69.

The bottom plate 70 is formed by press molding being performed on a plate material formed of a light metal such as an aluminum alloy. The bottom plate 70 is fixed to the lower surface of a lower wall portion 66D of the peripheral wall 66 by means such as welding and riveting. The outer edge portion of the bottom plate 70 is the fixed piece 30, and the fixed piece 30 projects to the vehicle outer side in the vehicle horizontal direction beyond the peripheral wall 66 as illustrated in FIG. 7. By the fixed piece 30 being fastened (coupled) with the right and left rocker panels 63, the battery case 64, that is, the battery pack 20 is fixed to the rocker panels 63 while being supported from the lower side by the bottom plate 70.

A configuration of the peripheral wall 66 will be described below. As illustrated in FIGS. 7 and 8, the peripheral wall 66 is configured to include a pair of right and left side wall portions 66S facing each other in the vehicle width direction, a front wall portion 66Fr connecting the front ends of the side wall portions 66S to each other, and a rear wall portion 66Rr connecting the rear ends of the side wall portions 66S to each other. The front wall portion 66Fr and the rear wall portion 66Rr face each other in the vehicle front-rear direction. As illustrated in FIG. 8, the peripheral wall 66 is formed such that the sectional shape of the peripheral wall 66 is a substantially B-shape (substantially the shape of two squares attached to each other) when the peripheral wall 66 is seen from a circumferential direction (longitudinal direction of the extrusion-molded article).

To be more specific with regard to the sectional shape of the peripheral wall 66, the peripheral wall 66 is provided with an outer peripheral wall portion 66A forming the outer peripheral surface of the peripheral wall 66, an inner peripheral wall portion 66B facing the outer peripheral wall portion 66A and forming the inner peripheral surface of the peripheral wall 66, the upper wall portion 66C connecting the upper end of the outer peripheral wall portion 66A and the upper end of the inner peripheral wall portion 66B to each other in the vehicle horizontal direction, the lower wall portion 66D connecting the lower end of the outer peripheral wall portion 66A and the lower end of the inner peripheral wall portion 66B to each other in the vehicle horizontal direction, and a partition wall portion 66E connecting the up-down direction intermediate portions of the outer peripheral wall portion 66A and the inner peripheral wall portion 66B to each other in the vehicle horizontal direction. The peripheral wall 66 is divided into an upper portion 72 and a lower portion 74 and is separated (partitioned) into an upper space 72A and a lower space 74A by the partition wall portion 66E.

A first cross member 76 extends along the vehicle width direction above the bottom plate 70 between the side wall portions 66S of the peripheral wall 66 facing each other in the vehicle width direction. A plurality of (three herein) the first cross members 76 is provided such that the first cross members 76 are arranged at equal intervals along the vehicle front-rear direction between the front wall portion 66Fr and the rear wall portion 66Rr.

The first cross member 76 is formed of an elongated extrusion-molded article that is formed by extrusion molding being performed on a light metal such as an aluminum alloy. The first cross member 76 is formed such that the sectional shape of the first cross member 76 is a substantially B-shape (substantially the shape of two squares attached to each other, not illustrated) when the first cross member 76 is cut along a width direction substantially orthogonal to the longitudinal direction (vehicle width direction).

To be more specific with regard to the sectional shape of the first cross member 76, the first cross member 76 is provided with a front wall portion (not illustrated) disposed in a front portion in the vehicle front-rear direction, a rear wall portion 76A disposed in a rear portion in the vehicle front-rear direction, a second lateral wall 76B connecting the upper end of the front wall portion and the upper end of the rear wall portion 76A to each other in the vehicle horizontal direction, a lower wall portion 76C connecting the lower end of the front wall portion and the lower end of the rear wall portion 76A to each other in the vehicle horizontal direction, and a partition wall portion 76D connecting the up-down direction intermediate portions of the second lateral wall 76B and the lower wall portion 76C to each other in the vehicle horizontal direction as illustrated in FIG. 8. The first cross member 76 is divided into an upper portion 78 and a lower portion 80 and is separated into an upper space 78A and a lower space 80A by the partition wall portion 76D.

In the third embodiment, the inclined upper wall portion 22B of the outer portion 22, the inclined upper wall portion 24D of the inner portion 24, and the upper wall portion 18C of the floor cross member 18 are continuously disposed in the vehicle width direction and set in an overlapping manner in vehicle side view on the upper portion 63A side of the rocker panel 63.

The "continuous disposition in the vehicle width direction" means that the impact load F can be transmitted along the vehicle width direction, and the members adjacent to each other in the vehicle width direction do not necessarily have to be adjacent to each other and may have a slight gap as well. At least parts of the members adjacent to each other in the vehicle width direction may also overlap each other in the vehicle up-down direction.

The "overlapping in vehicle side view" means a state where the impact load F can be transmitted along the vehicle width direction, and the members disposed adjacent to each other in the vehicle width direction may overlap each other in vehicle side view in at least parts in the vehicle up-down direction. Still, when it comes to a member in which a plurality of members is bonded and integrated while overlapping each other in the vehicle up-down direction (integrated member), the impact load F is transmitted in the entire integrated member, and thus a part of the integrated member may overlap the members disposed adjacent to each other in the vehicle width direction in vehicle side view.

As a specific example, the partition wall 25 and the lateral wall portion 24C of the rocker panel 63, the floor panel 12, the flange portion 18D (refer to FIG. 7) of the floor cross member 18, and the flange portion 18E are continuously disposed in the vehicle width direction and set in an overlapping manner in vehicle side view on the upper portion 63A side of the rocker panel 63.

The floor panel 12 is bonded onto the lateral wall portion 24C of the rocker panel 63 and the flange portion 18D and the flange portion 18E of the floor cross member 18 are bonded onto the floor panel 12. In other words, the lateral wall portion 24C of the rocker panel 63, the floor panel 12, and the flange portion 18D and the flange portion 18E of the floor cross member 18 partially overlap each other in the vehicle up-down direction.

The lateral wall portion 24C of the rocker panel 63, the floor panel 12, and the flange portion 18D and the flange portion 18E of the floor cross member 18 are bonded in an integrated state, and a part of the element overlaps the partition wall 25 of the rocker panel 63 in vehicle side view.

On the lower portion 63B side of the rocker panel 63 with respect to the upper portion 63A side of the rocker panel 63, the first lateral wall 40A of the first shock absorbing portion 40, the upper wall portion 66C of the peripheral wall 66 of the battery case 64, and the second lateral wall 76B of the first cross member 76 are continuously disposed in the vehicle width direction and set in an overlapping manner in vehicle side view.

The first lateral wall 40B of the first shock absorbing portion 40 of the rocker panel 63, the partition wall portion 66E of the peripheral wall 66 of the battery case 64, and the partition wall portion (second lateral wall) 76D of the first cross member 76 are continuously disposed in the vehicle width direction and set in an overlapping manner in vehicle side view.

The bottom wall portion 24E of the rocker panel 63, the lower wall portion 66D of the peripheral wall 66 of the battery case 64, and the lower wall portion 76C of the first cross member 76 are continuously disposed in the vehicle width direction and set in an overlapping manner in vehicle side view.

Action and Effect of Third Embodiment

The action and effect of the vehicle lower portion structure according to the third embodiment will be described below.

As illustrated in FIG. 8, in the rocker panel 63 according to the third embodiment, the outer portion 22 positioned on the outer side in the vehicle width direction and the inner portion 24 positioned on the inner side in the vehicle width direction are formed integrally with each other and the outer portion 22 and the inner portion 24 form the closed sectional portion 26. As a result, the rigidity of the rocker panel 63 itself can be higher than in a case where a rocker panel 63 is formed by the two panels of the outer portion 22 and the inner portion 24 being coupled with each other.

In the closed sectional portion 26 of the rocker panel 63, the first shock absorbing portion 40 extends in the vehicle width direction between the outer portion 22 and the inner portion 24 to overlap the battery pack 20 in vehicle side view. In the third embodiment, the battery pack 20 is provided with the battery case 64 as illustrated in FIG. 7 and the first cross members 76 extend along the vehicle width direction in the battery case 64. As a result, the rigidity of the battery case 64 itself is improved.

In the third embodiment, the first cross member 76 is provided to overlap the lower closed sectional portion 34 of the rocker panel 63 in vehicle side view. Accordingly, once the impact load F is input to the rocker panel 63 during the side collision of the vehicle, for example, some of the impact load F is transmitted to the first cross member 76 side of the battery case 64 via the first shock absorbing portion 40 (transmission load F5).

Once the transmission load F5 is transmitted to the first cross member 76 side of the battery case 64, a reaction force N5 from the first cross member 76 (strictly speaking, the rocker panel 65 (refer to FIG. 7) on the side opposite to the rocker panel 63 to which the impact load F is input through the first cross member 76 and the battery case 64) is obtained and the first shock absorbing portion 40 undergoes plastic deformation. Impact energy is absorbed by the plastic deformation of the first shock absorbing portion 40. As a result, the impact load F can be effectively reduced even in the event of a short stroke.

As described above, in the third embodiment, the first shock absorbing portion 40 is disposed in the closed sectional portion 26 of the rocker panel 63 to overlap the battery pack 20 disposed on the lower side of the floor panel 12 in vehicle side view and the first cross member 76 of the battery case 64 is set to overlap the first shock absorbing portion 40 in vehicle side view.

As a result, during the side collision of the vehicle, the plastic deformation of the first shock absorbing portion 40 is allowed to occur by the reaction force N5 from the first cross member 76 being used and the impact load F can be effectively reduced even in the event of a short stroke. As a result, inward folding of the rocker panel 63 can be suppressed.

To be even more specific with regard to the above, in the third embodiment, the first cross member 76 extending in the battery case 64, the peripheral wall 66 of the battery case 64, and the first shock absorbing portion 40 of the rocker panel 63 are continuously disposed in the vehicle width direction.

The first cross member 76 is configured to include the second lateral wall 76B, the partition wall portion 76D, and the lower wall portion 76C respectively extending in the vehicle width direction. The peripheral wall 66 constituting the outer wall of the battery case 64 is configured to include the upper wall portion 66C, the partition wall portion 66E, and the lower wall portion 66D respectively extending in the vehicle width direction. The first shock absorbing portion 40 extending in the rocker panel 63 is configured to include the first lateral wall 40A and the third lateral wall 40B respectively extending in the vehicle width direction.

In the third embodiment, the second lateral wall 76B of the first cross member 76 in the battery case 64 is set to overlap the upper wall portion 66C of the peripheral wall 66 of the battery case 64 and the first lateral wall 40A of the first shock absorbing portion 40 of the rocker panel 63 in vehicle side view.

Accordingly, once the impact load F is input to the rocker panel 63 during the side collision of the vehicle, some of the impact load F is transmitted to the upper wall portion 66C of the peripheral wall 66 of the battery case 64 and the second lateral wall 76B side of the first cross member 76 via the first lateral wall 40A of the first shock absorbing portion 40 of the rocker panel 63 (transmission load F51). Once the transmission load F51 is transmitted to the second lateral wall 76B side of the first cross member 76, the first lateral wall 40A of the first shock absorbing portion 40 of the rocker panel 63 obtains a reaction force N51 from the second lateral wall 76B of the first cross member 76.

The partition wall portion 76D of the first cross member 76 is set to overlap the partition wall portion 66E of the peripheral wall 66 of the battery case 64 and the third lateral wall 40B of the first shock absorbing portion 40 of the rocker panel 63 in vehicle side view.

Accordingly, once the impact load F is input to the rocker panel 63 during the side collision of the vehicle, some of the rest of the impact load F is transmitted to the partition wall portion 66E of the peripheral wall 66 of the battery case 64 and the partition wall portion 76D side of the first cross member 76 via the third lateral wall 40B of the first shock absorbing portion 40 (transmission load F52). Once the transmission load F52 is transmitted to the partition wall portion 76D side of the first cross member 76, the third lateral wall 40B of the first shock absorbing portion 40 of the rocker panel 63 obtains a reaction force N52 from the partition wall portion 76D of the first cross member 76.

The lower wall portion 76C of the first cross member 76 of the battery case 64 is set to overlap the lower wall portion 66D of the peripheral wall 66 of the battery case 64 and the bottom wall portion 24E of the rocker panel 63 in vehicle side view.

Accordingly, once the impact load F is input to the rocker panel 63 during the side collision of the vehicle, some of the rest of the impact load F is transmitted to the lower wall portion 66D of the peripheral wall 66 of the battery case 64 and the lower wall portion 76C side of the first cross member 76 via the bottom wall portion 24E of the rocker panel 63 (transmission load F53). Once the transmission load F53 is transmitted to the lower wall portion 76C side of the first cross member 76, the bottom wall portion 24E of the rocker panel 63 obtains a reaction force N53 from the lower wall portion 76C side of the first cross member 76.

As described above, in the third embodiment, the second lateral wall 76B of the first cross member 76 of the battery case 64, the upper wall portion 66C of the peripheral wall 66, and the first lateral wall 40A of the first shock absorbing portion 40 of the rocker panel 63 are continuously disposed in the vehicle width direction and set in an overlapping manner in vehicle side view. The partition wall portion 76D of the first cross member 76 of the battery case 64, the partition wall portion 66E of the peripheral wall 66, and the third lateral wall 40B of the first shock absorbing portion 40 of the rocker panel 63 are continuously disposed in the vehicle width direction and set in an overlapping manner in vehicle side view. The lower wall portion 76C of the first cross member 76 of the battery case 64, the lower wall portion 66D of the peripheral wall 66, and the bottom wall portion 24E of the rocker panel 63 are continuously disposed in the vehicle width direction and set in an overlapping manner in vehicle side view.

As a result, once the impact load F is input to the rocker panel 63 during the side collision of the vehicle, the impact load F can be effectively transmitted to the battery pack 20 side (transmission load F5) and the first shock absorbing portion 40 of the rocker panel 63 can be further effectively subjected to plastic deformation by the reaction force N5 from the battery pack 20 being obtained in a reliable manner.

Impact energy is absorbed by the plastic deformation of the first shock absorbing portion 40.

As described above, in the third embodiment, the first shock absorbing portion 40 is disposed in the closed sectional portion 26 of the rocker panel 63 and the second lateral wall 76B constituting at least a part of the first cross member 76 of the battery case 64 is set to overlap the first lateral wall 40A of the first shock absorbing portion 40 constituting at least a part of the first shock absorbing portion 40 in vehicle side view. Accordingly, the reaction force N51 from the first cross member 76 can be effectively obtained on the rocker panel 63 side.

The reaction force N52 from the first cross member 76 can be effectively obtained on the rocker panel 63 side by the partition wall portion 76D of the first cross member 76 being set to overlap the third lateral wall 40B of the first shock absorbing portion 40 in vehicle side view as is the case with the second lateral wall 76B of the first cross member 76. The reaction force N53 from the first cross member 76 can be effectively obtained on the rocker panel 63 side by the lower wall portion 76C of the first cross member 76 being set to overlap the bottom wall portion 24E of the rocker panel 63 in vehicle side view. In other words, the first cross member 76 contributes to the generation of a high load in the configuration above, and thus the impact load F can be effectively reduced even in the event of a short stroke by the amount of the impact energy absorption being increased.

In the third embodiment, the inclined upper wall portion 22B of the outer portion 22, the inclined upper wall portion 24D of the inner portion 24 of the rocker panel 63, and the upper wall portion 18C of the floor cross member 18 are continuously disposed in the vehicle width direction and set in an overlapping manner in vehicle side view on the upper portion 63A side of the rocker panel 63. The partition wall 25 and the lateral wall portion 24C of the rocker panel 63, the floor panel 12, the flange portion 18D (refer to FIG. 7) of the floor cross member 18, and the flange portion 18E are continuously disposed in the vehicle width direction and set in an overlapping manner in vehicle side view.

Also in this case, the impact load F can be effectively transmitted to the floor cross member 18 side (transmission load F6) and the rocker panel 63 undergoes plastic deformation by obtaining a reaction force N6 from the floor cross member 18 once the impact load F is input to the rocker panel 63 during the side collision of the vehicle as is the case with the lower portion 63B side of the rocker panel 63. As a result, impact energy is further absorbed.

To be more specific with regard to the above, in the third embodiment, the inclined upper wall portion 22B of the outer portion 22, the inclined upper wall portion 24D of the inner portion 24, and the upper wall portion 18C of the floor cross member 18 are continuously disposed in the vehicle width direction and set in an overlapping manner in vehicle side view on the upper portion 63A side of the rocker panel 63.

Accordingly, once the impact load F is input to the rocker panel 63 during the side collision of the vehicle, some of the impact load F is transmitted to the inclined upper wall portion 24D of the inner portion 24 and the upper wall portion 18C of the floor cross member 18 via the inclined upper wall portion 22B of the outer portion 22 of the rocker panel 63 (transmission load F61).

Once the transmission load F61 is transmitted to the upper wall portion 18C side of the floor cross member 18, the inclined upper wall portion 22B of the rocker panel 63 obtains a reaction force N61 from the upper wall portion 18C of the floor cross member 18 (strictly speaking, the rocker panel 65 (refer to FIG. 7) positioned on the side opposite to the rocker panel 63 to which the transmission load F61 is transmitted through the floor cross member 18).

In the third embodiment, the partition wall 25 and the lateral wall portion 24C of the rocker panel 63, the floor panel 12, the flange portion 18D (refer to FIG. 7) of the floor cross member 18, and the flange portion 18E are continuously disposed in the vehicle width direction and set in an overlapping manner in vehicle side view.

Accordingly, once the impact load F is input to the rocker panel 63 during the side collision of the vehicle, some of the impact load F is transmitted to the lateral wall portion 24C, the floor panel 12, and the flange portions 18D, 18E of the floor cross member 18 via the partition wall 25 of the rocker panel 63 (transmission load F62).

Once the transmission load F62 is transmitted to the lateral wall portion 24C, the floor panel 12, and the flange portions 18D, 18E side of the floor cross member 18, the partition wall 25 of the rocker panel 63 obtains a reaction force N62 from the floor panel 12 and the flange portions 18D, 18E of the floor cross member 18 (strictly speaking, the rocker panel 65 (refer to FIG. 7) positioned on the side opposite to the rocker panel 63 to which the transmission load F62 is transmitted through the floor panel 12 and the flange portions 18D, 18E of the floor cross member 18).

In other words, in the configuration described above, some of the impact load F input to the rocker panel 63 is transmitted to the floor cross member 18 side (transmission load F6) via the upper portion 63A side of the rocker panel 63 including the partition wall 25 of the rocker panel 63 during the side collision of the vehicle. Once the transmission load F6 is transmitted to the floor cross member 18, the rocker panel 63 obtains the reaction force N6 from the floor cross member 18. As a result, the upper portion 63A side of the rocker panel 63 undergoes plastic deformation and impact energy is absorbed.

Accordingly, in the third embodiment, impact energy can be further absorbed by the plastic deformation of the upper portion 63A side of the rocker panel 63 including the partition wall 25 of the rocker panel 63 and the first shock absorbing portion 40 disposed on the lower portion 63B side of the rocker panel 63.

In the third embodiment, a load transmission path C for transmission to the battery pack 20 side via the first shock absorbing portion 40 of the rocker panel 63 and a load transmission path D for transmission to the floor cross member 18 side via the upper portion 63A side of the rocker panel 63 including the partition wall 25 of the rocker panel 63 during the side collision of the vehicle can be formed. Accordingly, load dispersion can be aimed for regarding the impact load F input to the rocker panel 63.

In other words, in the third embodiment, inward folding of the rocker panel 63 can be suppressed by the use of the reaction force N5 from the battery pack 20 and the reaction force N6 from the floor cross member 18 by the first shock absorbing portion 40 and the partition wall 25 being disposed in the closed sectional portion 26 of the rocker panel 63 and the first shock absorbing portion 40 and the partition wall 25 being disposed to overlap the battery pack 20 and the floor cross member 18 in vehicle side view, respectively.

Supplementary Matters of Third Embodiment

In the third embodiment, the inclined upper wall portion 22B of the outer portion 22, the inclined upper wall portion 24D of the inner portion 24, and the upper wall portion 18C of the floor cross member 18 are continuously disposed in the vehicle width direction and set in an overlapping manner in vehicle side view on the upper portion 63A side of the rocker panel 63 as illustrated in FIG. 8. However, the upper wall portion 18C of the floor cross member 18 and the inclined upper wall portion 24D of the inner portion 24 do not necessarily have to overlap each other in vehicle side view and the floor cross member 18 is optional.

Although the partition wall 25 is disposed alone on the upper portion 63A side of the rocker panel 63 instead of the second shock absorbing portion 38 (refer to FIG. 2) in the third embodiment, it is a matter of course that the second shock absorbing portion 38 may also be disposed. In other words, the rate of the impact energy absorption can be adjusted on the upper portion 63A side and the lower portion 63B side of the rocker panel 63 during the side collision of the vehicle by the shape of the shock absorbing portion being changed.

Fourth Embodiment

Figure 9:
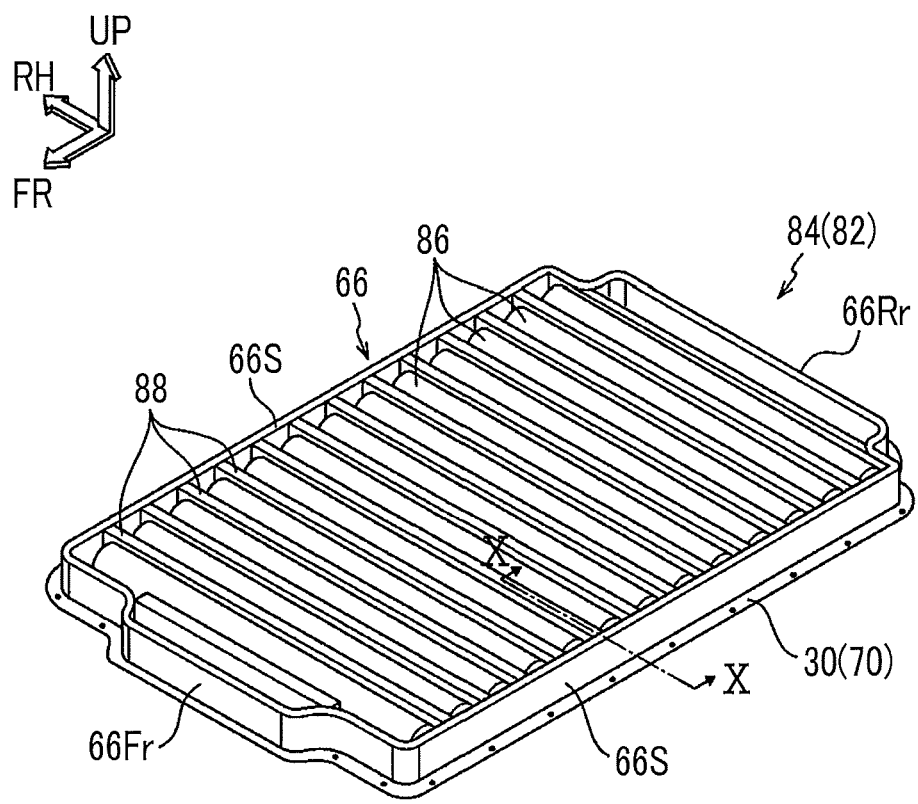
FIG. 9 is a perspective view of a fuel cell mounted in a vehicle lower portion to which a vehicle lower portion structure according to a fourth embodiment is applied.

Although the battery pack 20 is used as the drive force supply device for supplying the electric power to the power unit as illustrated in FIG. 7 in the third embodiment, a case where a fuel cell 82 illustrated in FIG. 9 is used as the drive force supply device will be described in a fourth embodiment. In the following description, description will be omitted with regard to substantially the same configuration as in the third embodiment.

As illustrated in FIG. 9, the fuel cell 82 is provided with a tank case 84 that has the vehicle front-rear direction as the longitudinal direction of the tank case 84 and is formed in a box shape which is flat in the vehicle up-down direction as is the case with the battery pack 20 (refer to FIG. 7) described in the third embodiment. A plurality of hydrogen tanks (fuel tanks) 86 filled with, for example, hydrogen is accommodated in the tank case 84.

The tank case 84 has the peripheral wall 66, the top plate 68, and the bottom plate 70 as is the case with the battery case 64 (refer to FIG. 7). The member has the same configuration as the battery case 64, and thus description thereof will be omitted.

The (13 herein) hydrogen tanks 86 accommodated in the tank case 84 are arranged along the vehicle front-rear direction and disposed along the vehicle width direction in the tank case 84. Accordingly, in the fourth embodiment, a plurality of (12 herein) second cross members 88 extends along the vehicle width direction above the bottom plate 70 between the side wall portions 66S of the peripheral wall 66 facing each other in the vehicle width direction. The rigidity of the tank case 84 itself is improved by the second cross members 88 extending along the vehicle width direction in the tank case 84 as described above.

Figure 10:
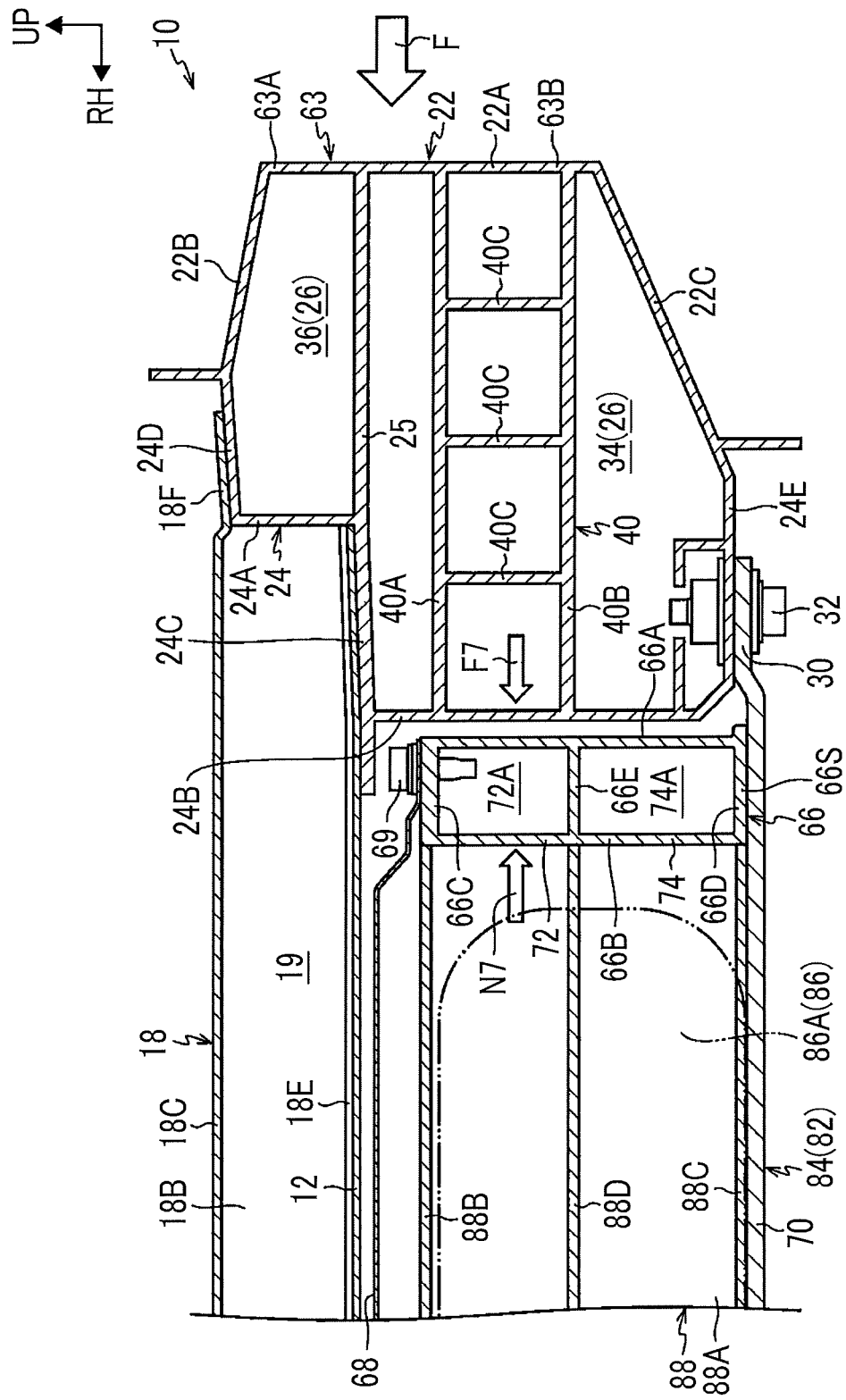
FIG. 10 is a sectional view cut along line X-X of FIG. 9 including the vehicle lower portion illustrated in FIG. 7.

The hydrogen tanks 86 disposed next to each other in the vehicle front-rear direction are partitioned from each other by the second cross members 88. As illustrated in FIG. 10, both end portions of a tank body 86A in the longitudinal direction (vehicle width direction herein) are set such that the end portions are not in direct contact with the inner peripheral wall portion 66B of the peripheral wall 66.

In the fourth embodiment, the first shock absorbing portion 40 extends in the vehicle width direction between the outer portion 22 and the inner portion 24 to overlap the fuel cell 82 in vehicle side view in the closed sectional portion 26 of the rocker panel 63. In the fuel cell 82, the second cross members 88 extend along the vehicle width direction in the tank case 84 as illustrated in FIG. 9.

In the fourth embodiment, the second cross member 88 is provided to overlap the ladder-shaped shock absorbing portion (fourth shock absorbing portion) 40 disposed in the lower closed sectional portion 34 of the rocker panel 63 in vehicle side view. The configuration of the second cross member 88 and the relationship between the second cross member 88 and the first shock absorbing portion 40 are substantially the same as the configuration of the first cross member 76 illustrated in FIG. 8 and the relationship between the first cross member 76 illustrated in FIG. 8 and the first shock absorbing portion 40. Accordingly, description thereof will be omitted with the rear wall portion 76A, the second lateral wall 76B, the lower wall portion 76C, and the partition wall portion 76D of the first cross member 76 respectively replaced with a rear wall portion 88A, an upper wall portion 88B, a lower wall portion 88C, and a fourth lateral wall 88D in the second cross member 88 illustrated in FIG. 10.

In the second embodiment, the second shock absorbing portion 38 is disposed at a position (on the upper portion 46A side of the rocker panel 46) not overlapping the hydrogen tank 44 in vehicle side view in the rocker panel 46 as illustrated in FIG. 4 and the impact load F is not input to the hydrogen tank 44 side.

In the fourth embodiment, in contrast, some of the impact load F is input to the hydrogen tank 86 side as illustrated in FIG. 10. In the fourth embodiment, the rigidity of the tank case 84 itself is improved by the tank case 84 accommodating the hydrogen tanks 86 being disposed in the fuel cell 82 as illustrated in FIG. 9 and the second cross members 88 extending along the vehicle width direction in the peripheral wall 66 constituting the outer shape of the tank case 84. As illustrated in FIG. 10, both end portions of the tank body 86A in the longitudinal direction are set such that the end portions are not in direct contact with the inner peripheral wall portion 66B of the peripheral wall 66. As a result, even when the impact load F is input to the rocker panel 63 and some of the impact load F is transmitted to the fuel cell 82 side (transmission load F7) during the side collision of the vehicle, the transmission load F7 is not directly input to the hydrogen tank 86.

In the fourth embodiment, the rocker panel 63 obtains a reaction force N7 from the second cross member 88 (strictly speaking, the rocker panel 65 (refer to FIG. 7) on the side opposite to the rocker panel 63 to which the transmission load F7 is transmitted through the second cross member 88) once the transmission load F7 is transmitted to the second cross member 88 side of the tank case 84. As a result, the first shock absorbing portion 40 of the rocker panel 63 undergoes plastic deformation and impact energy is absorbed. In other words, according to the fourth embodiment, the impact load can be effectively reduced even in the event of a short stroke, and thus some of the impact load F can be transmitted to the fuel cell 82 side.

As described above, in the fourth embodiment, the first shock absorbing portion 40 is disposed in the closed sectional portion 26 of the rocker panel 63 and the position of the second cross member 88 of the tank case 84 is set to overlap the first shock absorbing portion 40 in vehicle side view. Accordingly, the reaction force N7 from the second cross member 88 can be used and inward folding of the rocker panel 63 can be suppressed.

Although examples of the embodiments have been described above, the embodiments are not limited thereto. It is a matter of course that any one of the embodiments may be appropriately combined with various modification examples and implementation in various aspects is also possible.

What is claimed is:

1. A vehicle lower portion structure comprising:
a pair of rocker panels extending along a vehicle front-rear direction, the rocker panels being respectively arranged on both outer sides of a vehicular floor panel in a vehicle width direction; and
an electric power supply device arranged below the floor panel, wherein:
the rocker panel is configured to include an outer portion, an inner portion, and a first shock absorbing portion;
the outer portion is positioned to define an outer wall of the rocker panel in the vehicle width direction;
the inner portion is formed integrally with the outer portion, is positioned inward of the outer portion in the vehicle width direction, and forms a closed sectional portion with the outer portion;
the first shock absorbing portion extends in the vehicle width direction from the outer portion to the inner portion in the closed sectional portion and is disposed to overlap the electric power supply device in vehicle side view
the electric power supply device is a storage battery;
the storage battery is provided with a battery case accommodating a plurality of battery modules;
a first cross member extending along the vehicle width direction is disposed to overlap the first shock absorbing portion in vehicle side view in the battery case;
the first shock absorbing portion is configured to include a first lateral wall extending in the vehicle width direction; and
the first cross member is configured to include a second lateral wall overlapping the first lateral wall extending in the vehicle width direction in vehicle side view.

2. The vehicle lower portion structure according to claim 1, wherein the first shock absorbing portion includes
a third lateral wall extending in the vehicle width direction and disposed in parallel to the first lateral wall, and
a first connecting wall connecting the first lateral wall and the third lateral wall to each other between the first lateral wall and the third lateral wall.

3. The vehicle lower portion structure according to claim 2, wherein:
the first shock absorbing portion is configured to include a fourth lateral wall extending in the vehicle width direction, and
the vehicle lower portion structure further comprises a second cross member configured to include a fifth lateral wall overlapping the fourth lateral wall extending in the vehicle width direction in vehicle side view.

4. A vehicle lower portion structure comprising:
a pair of rocker panels extending along a vehicle front-rear direction, the rocker panels being respectively arranged on both outer sides of a vehicular floor panel in a vehicle width direction;
a floor cross member disposed between the rocker panels above the floor panel and extending along the vehicle width direction; and
an electric power supply device arranged below the floor panel, wherein:
the rocker panel is configured to include an outer portion, an inner portion, and a first shock absorbing portion;
the outer portion is positioned to define an outer wall of the rocker panel in the vehicle width direction;
the inner portion is formed integrally with the outer portion, is positioned inward of the outer portion in the vehicle width direction, and forms a closed sectional portion with the outer portion;
the first shock absorbing portion extends in the vehicle width direction from the outer portion to the inner portion in the closed sectional portion and is disposed to overlap the electric power supply device in vehicle side view; and
the rocker panel is configured to further include a second shock absorbing portion extending in the vehicle width direction from the outer portion to the inner portion in the closed sectional portion and disposed to overlap the floor cross member in vehicle side view.

5. The vehicle lower portion structure according to claim 4, wherein:
the electric power supply device is a fuel cell;
the fuel cell is provided with a tank case in which fuel tanks disposed along the vehicle width direction are arranged along the vehicle front-rear direction; and
a second cross member partitioning the fuel tanks disposed next to each other in the vehicle front-rear direction from each other and extending along the vehicle width direction to overlap the first shock absorbing portion in vehicle side view is disposed in the tank case.

6. A vehicle lower portion structure comprising:
a pair of rocker panels extending along a vehicle front-rear direction, the rocker panels being respectively arranged on both outer sides of a vehicular floor panel in a vehicle width direction; and
a floor cross member disposed between the rocker panels above the floor panel and extending along the vehicle width direction, wherein:
the rocker panel is configured to include an outer portion, an inner portion, and a third shock absorbing portion;
the outer portion is positioned to define an outer wall of the rocker panel in the vehicle width direction;
the inner portion is formed integrally with the outer portion, is positioned inward of the outer portion in the vehicle width direction, and forms a closed sectional portion with the outer portion; and
the third shock absorbing portion extends in the vehicle width direction between the outer portion and the inner portion in the closed sectional portion and is disposed to overlap the floor cross member in vehicle side view.

7. The vehicle lower portion structure according to claim 6, further comprising an electric power supply device arranged below the floor panel.

8. The vehicle lower portion structure according to claim 7, wherein the electric power supply device is a storage battery.

9. The vehicle lower portion structure according to claim 7, wherein that the electric power supply device is a fuel cell.

10. The vehicle lower portion structure according to claim 7, further comprising a fourth shock absorbing portion extending in the vehicle width direction from the outer portion to the inner portion in the closed sectional portion and the fourth shock absorbing portion being disposed at a position overlapping the electric power supply device in vehicle side view.

11. The vehicle lower portion structure according to claim 6, wherein:
the third shock absorbing portion is configured to include a sixth lateral wall extending in the vehicle width direction; and the floor cross member is configured to include a seventh lateral wall overlapping the sixth lateral wall extending in the vehicle width direction in vehicle side view.

12. The vehicle lower portion structure according to claim 11, wherein the third shock absorbing portion includes an eighth lateral wall extending in the vehicle width direction and disposed in parallel to the sixth lateral wall, and a second connecting wall connecting the sixth lateral wall and the eighth lateral wall to each other between the sixth lateral wall and the eighth lateral wall.

13. The vehicle lower portion structure according to claim 6, further comprising a tunnel portion protruding toward an inside of a vehicle cabin and extending along the vehicle front-rear direction in a middle portion of the floor panel in the vehicle width direction, wherein the floor cross member extends between the rocker panels and the tunnel portion is provided between the rocker panels.

\* \* \* \* \*